US009580519B2

(12) United States Patent
Nogi et al.

(10) Patent No.: US 9,580,519 B2
(45) Date of Patent: Feb. 28, 2017

(54) METHOD AND APPARATUS FOR PRODUCING POLYACRYLIC ACID (SALT)-BASED WATER ABSORBENT RESIN

(75) Inventors: Kozo Nogi, Hyogo (JP); Syuji Kanzaki, Hyogo (JP); Kunihiko Ishizaki, Hyogo (JP); Shinichi Fujino, Hyogo (JP); Satoshi Matsumoto, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 630 days.

(21) Appl. No.: 14/112,774

(22) PCT Filed: Apr. 20, 2012

(86) PCT No.: PCT/JP2012/060713
§ 371 (c)(1),
(2), (4) Date: Dec. 27, 2013

(87) PCT Pub. No.: WO2012/144595
PCT Pub. Date: Oct. 26, 2012

(65) Prior Publication Data
US 2014/0114035 A1    Apr. 24, 2014

(30) Foreign Application Priority Data
Apr. 20, 2011   (JP) .................................. 2011-093829

(51) Int. Cl.
*H01B 1/00*   (2006.01)
*C08F 2/18*   (2006.01)
(Continued)

(52) U.S. Cl.
CPC .............. *C08F 2/18* (2013.01); *C08F 220/06* (2013.01); *C08J 3/12* (2013.01); *C08J 2333/02* (2013.01)

(58) Field of Classification Search
CPC ................................. C08F 2/18; C08F 220/06
See application file for complete search history.

(56) References Cited

U.S. PATENT DOCUMENTS

| 4,286,082 A | 8/1981 | Tsubakimoto et al. |
| 4,666,983 A | 5/1987 | Tsubakimoto et al. |

(Continued)

FOREIGN PATENT DOCUMENTS

| DE | 19511769 | 10/1995 |
| EP | 497623 | 1/1992 |

(Continued)

OTHER PUBLICATIONS

International Preliminary Report on Patentability issued in International Application No. PCT/JP2012/060713 dated Oct. 22, 2013.
(Continued)

*Primary Examiner* — Bijan Ahvazi
*Assistant Examiner* — Thuy-Ai N Nguyen
(74) *Attorney, Agent, or Firm* — Dickinson Wright PLLC

(57) ABSTRACT

The purpose of the present invention is to provide a method for producing a water absorbent resin in which a water absorbent resin having excellent properties can be obtained effectively. The present invention relates to a method for producing a polyacrylic acid (salt)-based water absorbent resin, which includes a polymerization step of polymerizing an aqueous monomer solution containing a polymerization inhibitor, acrylic acid (salt) and an internal cross-linking agent to produce a water-containing gel-like cross-linked polymer, a gel-crushing step of performing the gel-crushing of the water-containing gel-like cross-linked polymer simultaneously with or subsequent to the polymerization to produce a particulate water-containing gel-like cross-linked polymer, and a drying step of supplying the particulate water-containing gel-like cross-linked polymer to a continu- (Continued)

ous through-flow belt-type dryer by a traverse conveyor to dry the particulate water-containing gel-like cross-linked polymer, in which the belt temperature of the traverse conveyor is 40 to 120° C. and/or the water soluble component in the particulate water-containing gel-like cross-linked polymer on the traverse conveyor is 10% by weight or less and the water soluble component is increased after the drying step.

19 Claims, 4 Drawing Sheets

(51) Int. Cl.
*C08F 220/06* (2006.01)
*C08J 99/00* (2006.01)
*C08J 3/12* (2006.01)

(56) References Cited

U.S. PATENT DOCUMENTS

| | | |
|---|---|---|
| 4,734,478 A | 3/1988 | Tsubakimoto et al. |
| 5,124,416 A | 6/1992 | Haruna et al. |
| 5,229,487 A | 7/1993 | Tsubakimoto et al. |
| 5,409,771 A | 4/1995 | Dahmen et al. |
| 6,565,768 B1 | 5/2003 | Dentler et al. |
| 6,620,889 B1 | 9/2003 | Mertens et al. |
| 6,641,064 B1 | 11/2003 | Dentler et al. |
| 6,710,141 B1 | 3/2004 | Heide et al. |
| 2004/0234607 A1* | 11/2004 | Irie .................... B29C 47/0004 424/486 |
| 2008/0202987 A1 | 8/2008 | Weismantel et al. |
| 2008/0214749 A1 | 9/2008 | Weismantel et al. |
| 2008/0287631 A1 | 11/2008 | Nitschke |
| 2010/0041549 A1 | 2/2010 | Weismantel et al. |
| 2012/0048973 A1 | 3/2012 | Stueven et al. |
| 2012/0157644 A1 | 6/2012 | Fujino et al. |
| 2012/0157648 A1 | 6/2012 | Matsumoto et al. |

FOREIGN PATENT DOCUMENTS

| | | |
|---|---|---|
| EP | 855232 | 7/1998 |
| EP | 948997 | 10/1999 |
| EP | 0955086 | 11/1999 |
| EP | 1178059 | 2/2002 |
| EP | 1470905 | 10/2004 |
| JP | 8-73518 | 3/1996 |
| JP | 11-349687 | 12/1999 |
| JP | 2007-224224 | 9/2007 |
| WO | 90/04557 | 5/1990 |
| WO | 2011/025012 | 3/2011 |
| WO | 2011/025013 | 3/2011 |

OTHER PUBLICATIONS

International Search Report for PCT/JP2012/060713, dated Jul. 3, 2012.
Modern Superabsorbent Polymer Technology (1998) pp. 69-117.
Extended European Search Report, dated Oct. 28, 2014, issued in related EP Application No. 12774205.4.

* cited by examiner

METHOD AND APPARATUS FOR PRODUCING POLYACRYLIC ACID (SALT)-BASED WATER ABSORBENT RESIN

TECHNICAL FIELD

The present invention relates to a method for producing a polyacrylic acid (salt)-based water absorbent resin. More specifically, it relates to a method for producing a water absorbent resin for an absorbent body that is used for paper diapers, sanitary napkins and the like, that is, a method and an apparatus for producing a water absorbent resin for industrial use which shows no troubles in a production process or reduction in physical properties.

DESCRIPTION OF RELATED ART

A water absorbent resin is generally obtained by drying a water-containing gel-like cross-linked polymer (hereinafter, referred to as "hydrogel"), which is obtained by polymerizing a hydrophilic unsaturated monomer, to powder. As the hydrophilic unsaturated monomer, acrylic acid (salt), in particular partially neutralized sodium acrylate is used as a main component. The hydrogel obtained by polymerizing the monomer is dried, generally pulverized and classified to the extent that particles with desired size are obtained. The powder-like water absorbent resin obtained thereby is then preferably subjected to a surface cross-linking step to yield a water absorbent resin having excellent water absorption capacity under load (for example, AAP) or liquid permeability (for example, SFC). Meanwhile, the surface cross-linking step specifically indicates a step of forming a layer with high cross-linking density near the surface of a water absorbent resin by adding a monomer or a cross-linking agent to the water absorbent resin and reacting them with an aid of light or heat.

As described in Patent Literatures 1 to 25 or Non-Patent Literature 1 mentioned below, the step for producing a water absorbent resin includes various steps such as a polymerization step for obtaining a hydrogel, an optional step for gel-crushing, an optional step for gel transporting, a drying step, an optional step for removing undried product, a step for pulverizing and classifying dried polymer, and a surface cross-linking step. For having stable production or improved physical properties, various improved techniques have been proposed for each step described above. For example, there are an improved technique for obtaining a hydrogel by polymerizing an aqueous solution of monomer such as acrylic acid (Patent Literatures 1 to 6), an improved technique for gel-crushing the hydrogel (Patent Literatures 7 to 9), an improved technique for feeding the particulate hydrogel obtained after gel-crushing (herein below, referred to as "particulate hydrogel") to a dryer (Patent Literatures 10 to 13), an improved technique for drying the particulate hydrogel (Patent Literatures 14 to 16), an improved technique for removing undried product after drying (Patent Literatures 17 to 19), an improved technique for pulverizing and classifying the dried polymer (Patent Literatures 20 and 21), an improved technique for surface cross-linking (Patent Literatures 22 to 25), and the like.

However, in industrial production of a water absorbent resin which includes various steps, particularly, interconnected and continuous steps, in particular, in continuous production, a trouble (for example, temporary stop) or decreased productivity in single step leads to a reduction in physical properties or a decreased productivity of a final product.

As one of the biggest problems occurring in those production steps, there is a problem in adhesion or aggregation, or low flowability (reactivity) of a hydrogel. Methods for improving those problems are suggested for each step, for example, a polymerization step (Patent Literature 2), a gel-crushing step (Patent Literatures 8 and 9), a gel transporting step (Patent Literatures 10, 11, and 13), or the like. Since those problems of a hydrogel are the problems occurring in early stage of the production step in or prior to drying step, it also has a huge impact (reduction in physical properties, decreased productivity, coloration, or the like) on each step following it (for example, pulverizing, classification, or surface cross-linking described in Patent Literatures 20 to 25 etc.). Recently, as the production amount of a water absorbent resin increases, production amount per plant or production amount per unit time is also increased like 1 [t/hr] or so, and as a result, transporting, pulverizing, or drying of a hydrogel during production process becomes more difficult. For obtaining a paper diaper in thin form, there is a tendency that pulp with large volume is used in a decreased amount while the used amount or function of a water absorbent resin is increased. For such reasons, physical properties or coloration (whiteness) of a water absorbent resin is considered to be important more than ever.

CITATION LIST

Patent Literatures

Patent Literature 1: U.S. Pat. No. 6,710,141
Patent Literature 2: U.S. Pat. No. 5,124,416
Patent Literature 3: EP 0955086 A
Patent Literature 4: U.S. Pat. No. 6,565,768
Patent Literature 5: EP 1178059 A
Patent Literature 6: U.S. Pat. No. 4,286,082
Patent Literature 7: EP 1470905 A
Patent Literature 8: JP 11-349687 A
Patent Literature 9: EP 497623 A
Patent Literature 10: DP 19511769 A
Patent Literature 11: US 2010/041549 A
Patent Literature 12: US 2012/048973 A
Patent Literature 13: U.S. Pat. No. 5,229,487
Patent Literature 14: US 2008/214749 A
Patent Literature 15: WO 2011/025012 A
Patent Literature 16: WO 2011/025013 A
Patent Literature 17: EP 948997 A
Patent Literature 18: U.S. Pat. No. 6,641,064
Patent Literature 19: US 2008/287631 A
Patent Literature 20: EP 855232 A
Patent Literature 21: US 2008/202987 A
Patent Literature 22: U.S. Pat. No. 4,666,983
Patent Literature 23: U.S. Pat. No. 4,734,478
Patent Literature 24: U.S. Pat. No. 5,409,771
Patent Literature 25: U.S. Pat. No. 6,620,889

Non-Patent Literatures

Non-Patent Literature 1: Modern Superabsorbent Polymer Technology (1998) pages 69-117

SUMMARY OF INVENTION

Technical Problem

Due to increased demand for a paper diaper or the like in developing countries in recent years, large scale production of a water absorbent resin is required. Thus, there is a tendency of having scale-up per line or increasing polymerization concentration (in particular, Patent Literature 4; higher concentration of a monomer in an aqueous solution).

However, being accompanied by enlarged production scale, reduction in physical properties of the water absorbent resin or a trouble caused by scale-up also occurs frequently. For example, according to the drying method described in Patent Literature 14 or the like, an occurrence of a undried product by scale-up or reduction in physical properties of the water absorbent resin caused by excess drying is observed. In this regard, it is suggested in Patent Literatures 17 to 19 to remove undried products. However, being an additional step, it involves with cost increase or complex plant operation. Meanwhile, according to Patent Literatures 10 to 13, there was a case in which efficient transporting to a belt type dryer cannot be made depending on physical shape, properties of a hydrogel or the like. Further, according to a special method for gel-crushing described in Patent Literature 8 etc. as a technique to avoid such problem, reduced productivity is caused in gel-crushing, and a method of using additives (for example, a large amount of surfactant or the like) has a problem of not only increased cost but also reduction in physical properties of the water absorbent resin caused by additives (for example, decreased surface tension, decreased water absorption capacity under load, and coloration). Those problems are particularly significant in accordance with scale-up of the production facilities. Patent Literature 11 discloses a technique for improving adhesion of hydrogel by increasing the belt speed of a traverse conveyor belt to 0.4 [m/s] or higher. However, the effect obtained therefrom remains at insufficient level.

Accordingly, an object of the present invention is to provide a method for producing a water absorbent resin, in which a water absorbent resin having excellent physical properties or low coloration (whiteness) can be obtained effectively.

Solution to Problem

In order to solve the problems described above, inventors of the present invention conducted intensive studies, and as a result, found that the adhesive or aggregational property of a water-containing gel-like cross-linked polymer is one of the reasons for troubles relating to production and it also has an influence on physical properties of a dried polymer obtained by drying the water-containing gel-like cross-linked polymer and also on physical properties or coloration of the water absorbent resin as a final product.

Accordingly, it was found that the above problems can be solved by controlling the particle size of a particulate water-containing gel-like cross-linked polymer after polymerization, and belt temperature and belt speed of a traverse conveyor that is used for supplying the particulate water-containing gel-like cross-linked polymer to a continuous through-flow belt-type dryer, and the present invention is completed accordingly.

Specifically, the method for producing a polyacrylic acid (salt)-based water absorbent resin of the present invention is a method for producing a polyacrylic acid (salt)-based water absorbent resin including a polymerization step of polymerizing an aqueous monomer solution containing a polymerization inhibitor, acrylic acid (salt) and an internal cross-linking agent to produce a water-containing gel-like cross-linked polymer, a gel-crushing step of performing the gel-crushing of the water-containing gel-like cross-linked polymer simultaneously with or subsequent to the polymerization to produce a particulate water-containing gel-like cross-linked polymer, and a drying step of supplying the particulate water-containing gel-like cross-linked polymer to a continuous through-flow belt-type dryer by a traverse conveyor to dry the particulate water-containing gel-like cross-linked polymer, in which the belt temperature of the traverse conveyor is 40 to 120° C. and/or the water soluble component in the particulate water-containing gel-like cross-linked polymer on the traverse conveyor is 10% by weight or less and the water soluble component is increased after the drying step.

In other words, provided by the present invention is, as a first production method, a method for producing a polyacrylic acid (salt)-based water absorbent resin including a polymerization step of polymerizing an aqueous monomer solution containing a polymerization inhibitor, acrylic acid (salt) and an internal cross-linking agent to produce a water-containing gel-like cross-linked polymer, a gel-crushing step of performing the gel-crushing of the water-containing gel-like cross-linked polymer simultaneously with or subsequent to the polymerization to produce a particulate water-containing gel-like cross-linked polymer, and a drying step of supplying the particulate water-containing gel-like cross-linked polymer to a continuous through-flow belt-type dryer by a traverse conveyor to dry the particulate water-containing gel-like cross-linked polymer, in which the belt temperature of the traverse conveyor is 40 to 120° C.

Also provided by the present invention is, as a second production method, a method for producing a polyacrylic acid (salt)-based water absorbent resin including a polymerization step of polymerizing an aqueous monomer solution containing a polymerization inhibitor, acrylic acid (salt) and an internal cross-linking agent to produce a water-containing gel-like cross-linked polymer, a gel-crushing step of performing the gel-crushing of the water-containing gel-like cross-linked polymer simultaneously with or subsequent to the polymerization to produce a particulate water-containing gel-like cross-linked polymer, and a drying step of supplying the particulate water-containing gel-like cross-linked polymer to a continuous through-flow belt-type dryer by a traverse conveyor to dry the particulate water-containing gel-like cross-linked polymer, in which the water soluble component in the particulate water-containing gel-like cross-linked polymer on the traverse conveyor is 10% by weight or less and the water soluble component is increased after the drying step.

To solve the problems described above, also provided by the present invention is an apparatus for producing a water absorbent resin which has a traverse conveyor and a continuous through-flow belt-type dryer, in which the main body of the traverse conveyor is connected to the continuous through-flow belt-type dryer while being substantially covered.

Advantageous Effects of Invention

For industrial production of a water absorbent resin, troubles in a production step that are caused by adhesive or aggregational property of the water-containing gel-like cross-linked polymer are reduced, and thus a water absorbent resin having more excellent physical properties can be obtained efficiently.

BRIEF DESCRIPTION OF DRAWINGS

In FIG. 1, 1 represents a gel-crusher (meat chopper); 2 represents a pipe; 3 represents a traverse conveyor; 4 represents a continuous through-flow belt-type dryer; 5 represents a dryer (drying chamber); 6 represents a cooling chamber; 7 represents a site for measuring surface temperature of the belt of the traverse conveyor; 8 represents a particulate water-containing gel-like cross-linked polymer (particulate hydrogel); and 9 represents a dried polymer (water absorbent resin), respectively.

In FIG. 2, 2 represents a pipe; 3 represents a traverse conveyor; 4 represents a continuous through-flow belt-type dryer; and 7 represents a site for measuring surface temperature of the belt of the traverse conveyor, respectively.

In FIG. 3, 20 represents a cover for a part of the traverse conveyor and dryer; and 21 represents a cover for the exit of the meat chopper.

In FIG. 4, 22 represents a cover for the traverse conveyor belt; and 23 represents a cover for a part of the dryer.

DESCRIPTION OF EMBODIMENTS

Figure 1:
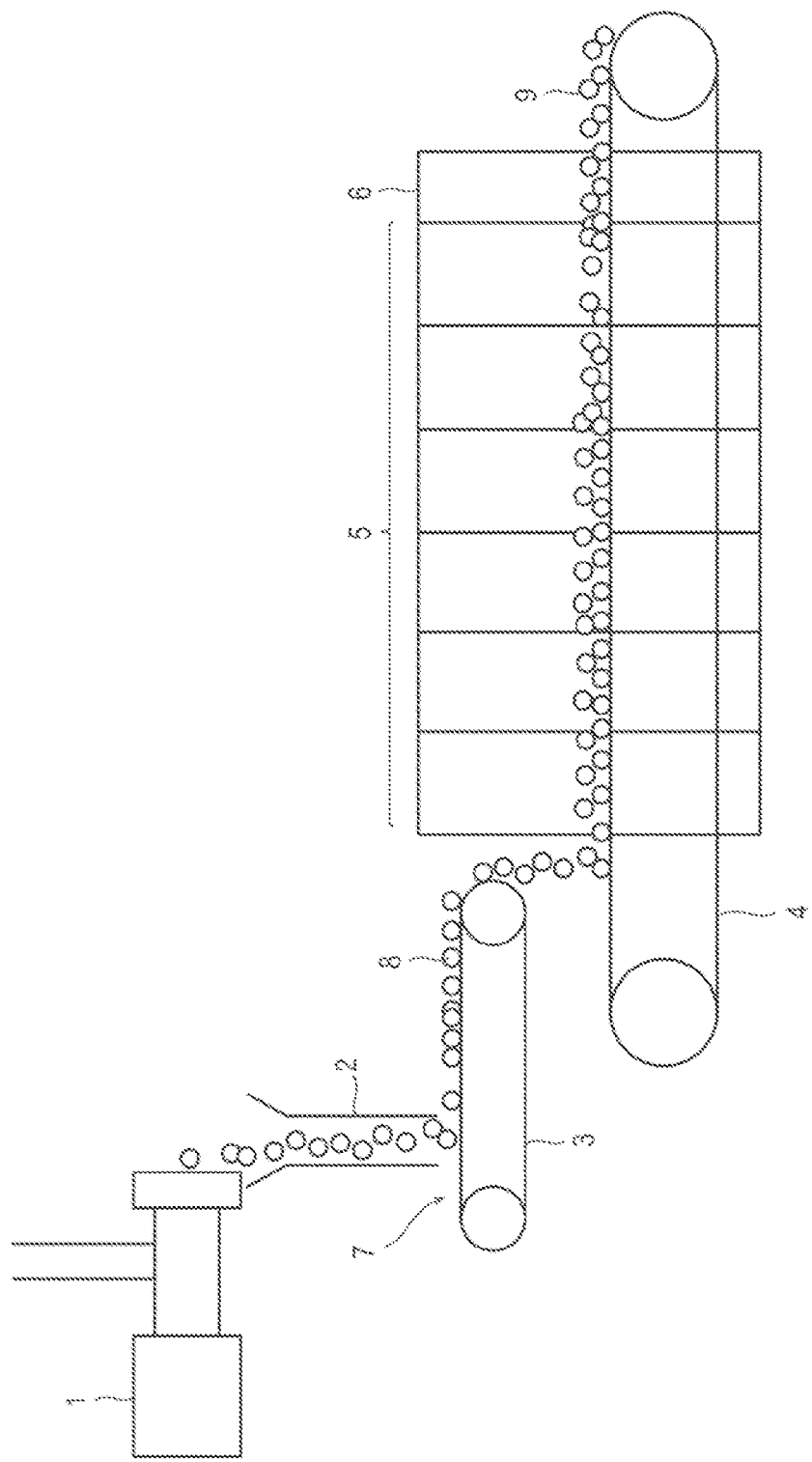
FIG. 1 is a schematic side view of a production apparatus according to a first embodiment which includes a gel-crusher, a traverse conveyor, and a continuous through-flow belt-type dryer.

Hereinafter, the method for producing a polyacrylic acid (salt)-based water absorbent resin according to the present invention will be described in detail. However, the scope of the present invention is not restricted to the following description, and those other than the following examples can be properly modified and carried out in a range where the gist of the present invention is not impaired. Specifically, the present invention is not limited to each of the following embodiments, and various modifications can be made within a range shown by the claims and embodiments carried out by properly combining each technical means disclosed with different embodiments are also included within the technical scope of the present invention.

[1] Definition of Terms (1-1) "Water Absorbent Resin"

In the present invention, a "water absorbent resin" means a water-swellable and water-insoluble polymer gelling agent. Herein, a "water-swellable" means a CRC (water absorption capacity without load) defined in ERT 441.2-02 in amount of usually 5 [g/g] or more. The term "water-insoluble" means Ext (water soluble component) defined in ERT 470.2-02 in amount of usually 0 to 50% by weight.

The water absorbent resin may be properly designed in accordance with the application and is not particularly limited, but preferably a hydrophilic cross-linked polymer obtained by cross-linking polymerization of an unsaturated monomer having a carboxyl group. Also, the water absorbent resin is not limited to a substance entirely (100% by weight) composed of a polymer but may contain an additive or the like to the extent that the above-mentioned properties can be maintained. That is, even a water absorbent resin composition containing a small amount of an additive is referred to as a water absorbent resin in the present invention. The content of the polyacrylic acid (salt)-based water absorbent resin is preferably 70 to 99.9% by weight relative to the entire water absorbent resin, more preferably 80 to 99.7% by weight, and still more preferably 90 to 99.5% by weight. The components other than the water absorbent resin are preferably water from the viewpoint of the water absorbent speed and impact resistance of powders (particles) and may include, if necessary, additives described below. Further, various forms resulting from each production step are also included. In addition, without being limited by the presence or absence of surface cross-linking, the shape of the water absorbent resin is not particularly limited, and examples include sheet-like, fiber-like, powder-like, film-like, gel-like shape or the like. Of those, the powder-like shape is preferable. A powder-like water absorbent resin having a particle size or moisture content described below is particularly preferable.

(1-2) "Polyacrylic Acid (Salt)"

In the present invention, the term "polyacrylic acid (salt)" means a polymer, which may contain a graft component as appropriate, and whose main component is acrylic acid and/or its salt (hereinafter, can be referred to as "acrylic acid (salt)") as its repeating unit.

More specifically, the polyacrylic acid (salt) means a polymer that contains acrylic acid (salt) in an amount of 50 to 100% by mol, preferably 70 to 100% by mol, more preferably 90 to 100% by mol, and particularly preferably substantially 100% by mol relative to total monomer (except internal cross-linking agents) used for polymerization. When polyacrylate salt is used as a polymer, it may include water soluble salts, and the main component of the neutralization salt is preferably monovalent salts, more preferably alkali metal salts or ammonium salts, still more preferably alkali metal salts and particularly preferably sodium salts.

(1-3) "EDANA" and "ERT"

"EDANA" is an abbreviation of European Disposables and Nonwovens Associations, and "ERT" is an abbreviation of the measurement methods of water absorbent resins (EDANA Recommended Test Methods) which is the European standards (approximately the world standards). Additionally, in the present invention, the physical properties of water absorbent resins are measured by reference to the original text of ERT (publicly known literature, revised in 2002), unless specifically described otherwise.

(a) "CRC" (ERT 441.2-02)

The "CRC" is an abbreviation of Centrifuge Retention Capacity and means water absorption capacity without load of the water absorbent resin (simply sometimes referred to as "water absorption capacity"). Specifically, the CRC is the water absorption capacity (unit; [g/g]) after 0.200 g of a water absorbent resin in a nonwoven fabric bag is freely swollen in 0.9% by weight aqueous sodium chloride solution present in excess amount for 30 minutes and dehydrated by a centrifuge.

(b) "AAP" (ERT 442.2-02)

The "AAP" is an abbreviation of Absorption Against Pressure and means water absorption capacity under load of the water absorbent resin. Specifically, the APP is the water absorption capacity (unit; [g/g]) after 0.900 g of the water absorbent resin is swollen in 0.9% by weight aqueous sodium chloride solution present in excess amount for 1 hour under 2.06 kPa (0.3 psi, 21 [g/cm$^2$]) load. Note that AAP is referred to as Absorption Under Pressure in ERT 442.2-02, but it substantially has the same meaning as above. Additionally, the measurement may be carried out by changing loading condition to 4.83 kPa (0.7 psi, 50 [g/cm$^2$]).

(c) "Ext" (ERT 470.2-02)

The "Ext" is an abbreviation of extractables, and means water soluble component (water soluble component amount) of a water absorbent resin. More specifically, Ext is water soluble component (unit; % by weight) measured by adding 1.000 g of the water absorbent resin into 200 ml of 0.9% by weight aqueous sodium chloride solution, stirring for 16 hours at 500 rpm, and measuring, by pH titration, an amount of dissolved polymer. The measurement of the dissolved polymer is performed by pH titration.

(d) "PSD" (ERT 420.2-02)

The "PSD" is an abbreviation of Particle Size Distribution and means the particle size distribution of a water absorbent resin measured by sieving classification. Additionally, the weight average particle diameter (D50) and the particle diameter distribution width of the water absorbent resin can be measured by the same method as in "(1) Average Particle Diameter and Distribution of Particle Diameter" described in EP 0349240 B, p. 7, lines 25 to 43 (for more detailed information regarding measurement condition or the like, see, WO 2004/069915 A or ERT 420.2-02). Meanwhile, for measuring a particle diameter of the particulate water-containing gel-like cross-linked polymer, the measurement is carried out in view of the method described in JP 2000-063527 A.

(e) "Moisture Content" (ERT 430.2-02)

"Moisture Content" means a water component or a volatile component contained in the water absorbent resin, and it is referred to as moisture content. Specifically, the moisture content (unit; % by weight) is calculated from drying loss obtained by drying 1 g of water absorbent resin at 105° C. for 3 hours. Note that in the present invention, drying temperature was changed to 180° C., the measurement was carried out 5 times for each sample, and an average value calculated from the five measurements was employed. The moisture content of a water-containing gel-like cross-linked polymer was also measured under a condition where a sample and drying time were changed to 3 g and 16 hours, respectively. Note also that a value calculated by {100−moisture content (% by weight)} is "resin solid content" in the present invention, and the resin solid content can be applied to both the water absorbent resin and the water-containing gel-like cross-linked polymer.

(1-4) "Liquid Permeability"

In the present invention, the "liquid permeability" means the flow of a liquid flowing among particles of swollen gel under a load or without load. The "liquid permeability" can be measured by SFC (Saline Flow Conductivity) or GBP (Gel Bed Permeability) as a representative measurement method.

The "SFC (Saline Flow Conductivity)" is liquid permeability of 0.69% by weight aqueous solution of sodium chloride in water absorbent resin (0.9 g) at a load of 2.06 kPa (0.3 psi). It is measured according to an SFC testing method described in U.S. Pat. No. 5,669,894. The "GBP (Gel Bed Permeability)" is liquid permeability of 0.69% by weight aqueous solution of sodium chloride in water absorbent resin under a load or a free swell. It is measured according to a GBP testing method described in WO 2005/016393 A.

(1-5) Traverse Conveyor

In the present specification, the "traverse conveyor" indicates a device for transporting the particulate hydrogel as described below in (2-3) Gel transporting step in view of FIG. 1 to FIG. 4, and it is a device being constructed of a belt conveyor in which a rotary belt has a function of rotating from side to side at pre-determined angle. Meanwhile, in the present specification, it is described as "traverse conveyor" for indicating the whole device while it is described simply as "belt" for indicating a belt conveyor. Meanwhile, although the belt moving from side to side is practically horizontal, it may also have pre-determined tilt as described below.

Belt of the traverse conveyor has a function of rotating from side to side at pre-determined angle. Although the angle is suitably determined, the belt is operated (i.e., rotated or rotated at constant or no-constant speed) such that the angle is preferably within the range of 120°, more preferably within the range of 90°, still more preferably within the range of 20°, and particularly preferably within the range of 10°, when the center part of the belt width of the continuous through-flow belt-type dryer for supplying the particulate hydrogel is taken as a center and the advancing direction of the dryer belt is 0°.

Figure 2:
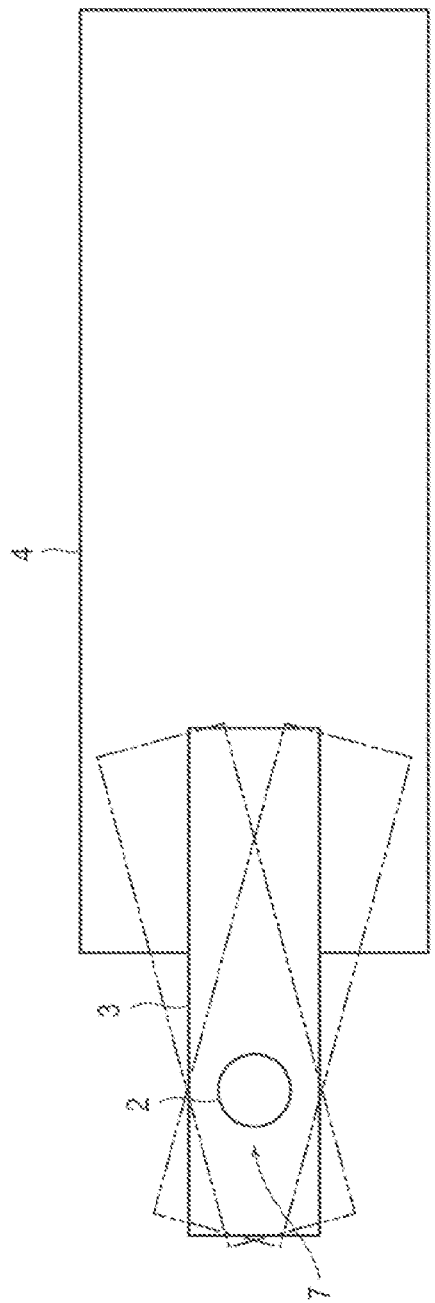
FIG. 2 is a schematic diagram illustrating the movement of the traverse conveyor as seen from above.
Figure 3:
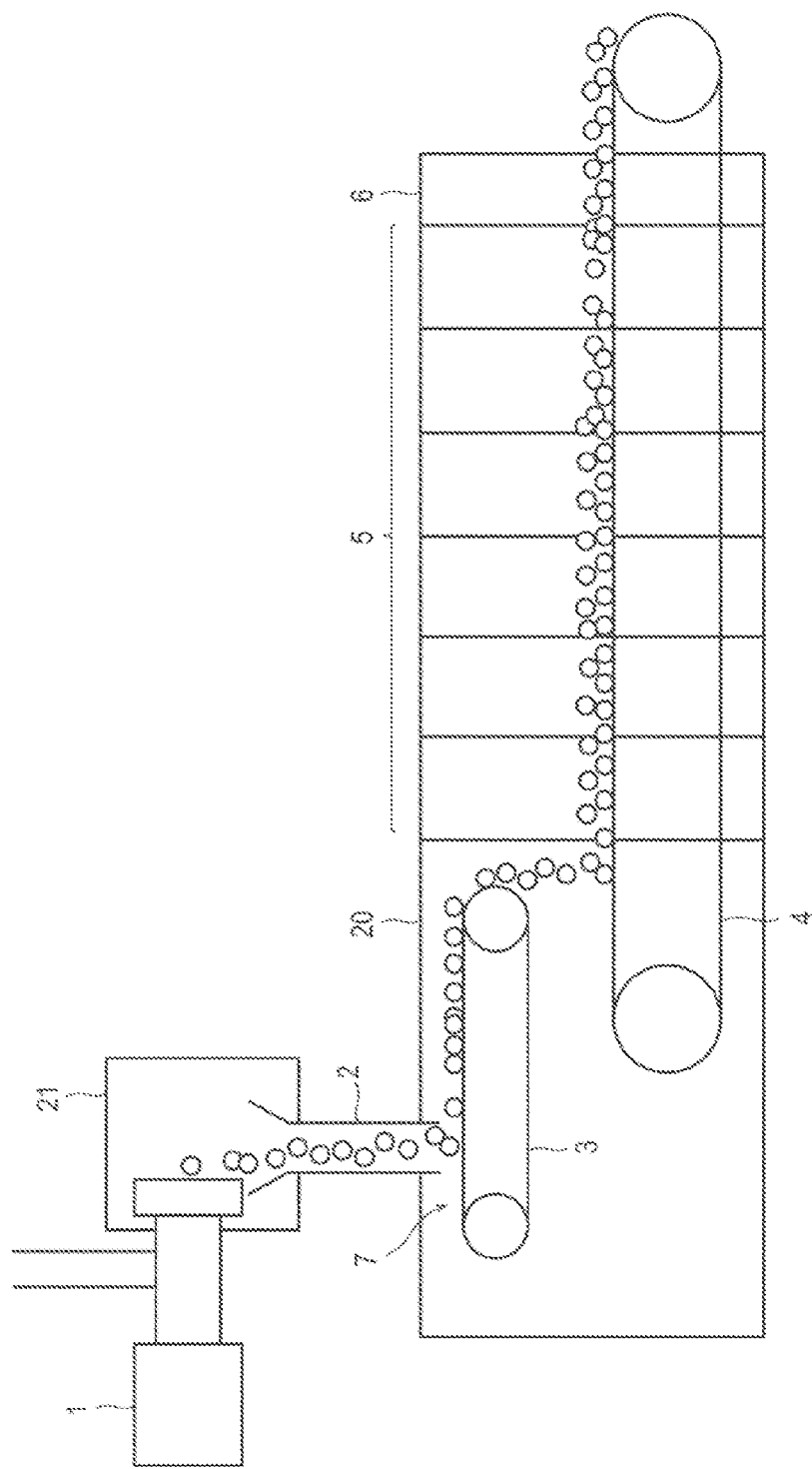
FIG. 3 is a schematic cross-sectional view of a production apparatus according to a second embodiment in which a cover is added on a part of the traverse conveyor and dryer and also the exit of the meat chopper that are shown in FIG. 1.

Meanwhile, supplying the particulate hydrogel to the continuous through-flow belt-type dryer with an aid of the traverse conveyor is described in Patent Literature 1, 10 to 12, 14, and 15 as well as FIG. 3.6 of Non-Patent Literature 1 or FIG. 2 and FIG. 3 of Patent Literature 5.

Further, if it is a conveyor having the identical or similar specification but different names such as a pendulum type conveyor, an oscillating conveyor, a sivel conveyor, a slewing conveyor, a tilting conveyor, and the like, it is regarded to have the same meaning as the traverse conveyor of the present invention.

(1-6) Others

In this specification, "X to Y" showing a range means "X or more but Y or lower". Also, the unit of mass "t (ton)" means "metric ton", and "mass" and "weight", "% by mass" and "% by weight", also "parts by mass" and "parts by weight" are used as a synonym. Further, "ppm" means "ppm by mass" or "ppm by weight" unless specifically described otherwise. Further, " . . . acid (salt)" means " . . . acid and/or its salt", "(meth) acrylic" means "acrylic and/or meth acrylic". Additionally, various physical properties were measured under the conditions of a room temperature (20 to 25° C.) and a relative humidity of 40 to 50%, unless specifically described otherwise.

[2] Method for Producing Polyacrylic Acid (Salt)-Based Water Absorbent Resin (2-1) Polymerization Step The polymerization step is the step for obtaining hydrogel by polymerizing an aqueous solution containing acrylic acid (salt) as a main component.

(Monomer)

In the polyacrylic acid (salt)-based water absorbent resin obtained by the present invention, acrylic acid (salt) is used as a main component of raw material (monomer) which is generally polymerized in an aqueous solution state. Also, in the case of the acrylic acid (salt) is used as a main component in the present invention, hydrophilic or hydrophobic unsaturated monomers (hereinafter, sometimes also referred to as "other monomers") may be used besides an acrylic acid (salt). Other monomers are not especially limited as long as they can be prepared as a water absorbent resin by polymerization. Examples thereof include an anionic unsaturated monomer such as (meth)acrylic acid, maleic acid (anhydride), itaconic acid, cinnamic acid, vinyl sulfonic acid, allyl toluene sulfonic acid, vinyltoluene sulfonic acid, styrene sulfonic acid, 2-(meth)acrylamido-2-methylpropane sulfonic acid, 2-(meth)acryloylethane sulfonic acid, 2-(meth)acryloylpropane sulfonic acid, 2-hydroxyethyl (meth)acryloyl phosphate, or the like; an esterified product of those acid group-containing monomers (e.g., (methoxy) polyethylene glycol acrylate); a mercapto group-containing unsaturated monomer; a phenolic hydroxy group-containing unsaturated monomer; an amide group-containing unsaturated monomer such as (meth)acrylamide, N-ethyl (meth)acrylamide, N,N-dimethyl (meth)acrylamide; or the like; an amino group-containing unsaturated monomer such as N,N-dimethylaminoethyl (meth)acrylate, N,N-dimethylaminopropyl (meth)acrylate, N,N-dimethylaminopropyl (meth)acrylamide or the like. In the case where these other monomers are used, their used amount is not particularly limited as long as the water absorption property of the water absorbent resin to be obtained is not deteriorated but it is preferably 50% by weight or lower and more preferably 20% by weight or lower relative to the total weight of the monomers. Meanwhile, for a case in which other monomers that are used, if necessary, are used, lower limit of the used amount is suitably determined depending on type, object, or effect of the monomers, and it is not particularly limited. Hereinafter, the acrylic acid (salt) and other monomers are all referred to as "acrylic acid (salt)-based monomers."

The concentration of the monomer in corresponding aqueous monomer solution is preferably between 20% by weight and the saturated concentration, more preferably between 25 and 80% by weight, and still more preferably between 30 and 70% by weight. It is not preferable that the monomer concentration be less than 20% by weight, because, if so, the productivity would be low. Further, as the polymerization in slurry (aqueous dispersion) state yields impaired physical properties, it is preferable to perform the polymerization at the saturated concentration or less (ref; JP 01-318021 A). Further, content (used amount) of the acrylic acid (salt)-based monomers is preferably 50% by mol or more, and more preferably in the order of 70% by mol or more, 80% by mol or more, and 90% by mol or more relative to total monomers (excluding internal cross-linking agent). Particularly preferably, it is 95% by mol or more (upper limit is 100% by mol).

In the present invention, the polyacrylic acid (salt) is not limited to a un-neutralized form (neutralization rate of 0% by mol) but it includes partial neutralization. From the viewpoint of physical properties of a water absorbent resin to be obtained, reactivity of a surface cross-linking agent or the like, it is preferable that part of the acid group of the acrylic acid (salt)-based monomers or hydrogel be partially neutralized (10% by mol or more, further 30% by mol or more). Specifically, the neutralization rate for the neutralization described herein (i.e., neutralization rate of the acid group in an aqueous monomer solution) is preferably more than 60% by mol, more preferably 61 to 100% by mol, still more preferably 65 to 90% by mol, and particularly preferably 65 to 75% by mol from the viewpoint of improving transporting property of the hydrogel to the continuous through-flow belt-type dryer, physical properties accompanied with even drying, or the like. If the neutralization rate is 60% by mol or lower, problems such as adhesion to a traverse conveyor used for gel transporting step or lower drying efficiency caused by difficult control of gel layer thickness in the continuous through-flow belt-type dryer used for the drying step may occur. Further, when the neutralization rate is low, water absorption capacity or water absorption speed may be lowered or it may become difficult to control particle size during the pulverizing step and the classification step. On the other hand, when the neutralization rate is excessively high, residual monomers or coloration may increase, or reactivity between the water absorbent resin powder and surface cross-linking agent, in particular reactivity with a dehydration-reactable surface cross-linking agent, further with ethylene carbonate is lowered due to a decrease in un-neutralized carboxyl group (—COOH group) so that productivity, liquid permeability (SFC), or water absorption capacity under load (AAP) may be reduced, and therefore undesirable.

The neutralization may be carried out in any form or any state before polymerization, during polymerization, or after polymerization. However, from the viewpoint of improvement of the productivity, physical properties or the like, it is preferably performed for the acid group of the monomers before polymerization. The neutralization salt for neutralization is, although not specifically limited, preferably monovalent salts selected from alkali metal salts, ammonium salts, and amine salts. It is more preferably alkali metal salts and still more preferably sodium salts, lithium salts, or potassium salts. It is particularly preferably sodium salts from the viewpoint of cost, handleability or the like. Further, temperature of the neutralization for neutralization is neither limited to a specific one but is preferably in a range of 10° C. to 100° C., and more preferably in a range of 30° C. to 90° C. As to other neutralization process conditions, the condition disclosed in EP 574260 is preferably applied to the present invention. Further, the monomers before polymerization may be heated to a pre-determined temperature by using neutralization heat or the dissolved oxygen may be reduced to a pre-determined amount or lower.

(Polymerization Inhibitor)

The aqueous monomer solution used in the present invention contains a polymerization inhibitor. Examples of the polymerization inhibitor include, although not specifically limited, an N-oxy compound, a manganese compound, a substituted phenol compound and the like described in WO 2008/096713 A. Among them, the substituted phenol compound is preferable, and methoxy phenols are particularly preferable. Specific examples of the methoxy phenols include o, m, p-methoxy phenol, methoxy phenols having one or more substituent groups such as methyl group, t-butyl group, and hydroxy group, and the like. To achieve an object of the present invention, p-methoxy phenol is particularly preferred in the present invention. The polymerization inhibitor may be used either singly or as a mixture of two or more types.

Content of the methoxy phenols is preferably 5 to 200 ppm, and more preferably in the order of 5 to 160 ppm, 10 to 160 ppm, 10 to 100 ppm, and 10 to 80 ppm relative to an acrylic acid (salt)-based monomer. Most preferably, it is 10 to 70 ppm. When the content is higher than 200 ppm, color deterioration (browning or yellowing) of the water absorbent resin to be obtained or increased residual monomer may be caused. On the other hand, when the content is less than 5 ppm, i.e., p-methoxy phenol is removed by purification such as distillation of the acrylic acid (salt)-based monomer, there is a high risk of having unexpected polymerization before initiating the desired polymerization. Further, as the anti-weathering property, whiteness (YI value and Lab value) or the like of the water absorbent resin to be obtained may be lowered, and therefore undesirable. When the content of methoxy phenols is within the range described above, the anti-weathering property (light resistance) of the water absorbent resin can be also improved.

(Iron component)

To solve the problems of the present invention, the acrylic acid (salt)-based monomer used in the present invention may further contain an iron component. The iron component is present in ion form in the aqueous monomer solution, and the content is, relative to total weight (solid content) of the acrylic acid (salt)-based monomer, preferably 0 to 10 ppm, and it is more preferably in the order of 0 to 5 ppm, higher than 0 but the same or less than 5 ppm, 0.001 to 5 ppm, and 0.001 to 4 ppm in terms of $Fe_2O_3$. It is most preferably 0.005 to 3 ppm. When the content of the iron component is lower than 10 ppm in terms of $Fe_2O_3$, coloration of the water absorbent resin to be obtained can be prevented. Although lower content of iron component is generally preferred, even when it is lower than N.D. (lower than detection limit), an effect corresponding to the cost may be not obtained or slow polymerization speed may be yielded for redox polymerization or the like.

The expression "in terms of $Fe_2O_3$" means that iron amount in an iron-containing compound (e.g., $Fe_2O_3$, iron salts, iron hydroxide, and iron complex etc.) or iron amount as iron itself is expressed as an amount of iron compound that is represented by $Fe_2O_3$ (molecular weight: 159.7), in which the iron amount can be uniquely calculated in view of the molecular weight and compositional formula. For example, when the iron content is 3 ppm in terms of $Fe_2O_3$, the iron (Fe) 3 ppm×55.85×2/159.7=about 2 ppm (Fe in $Fe_2O_3$).

Meanwhile, the content of iron component is controlled according to the method disclosed in WO 2006/109842 A. Further, the content of iron component in the aqueous monomer solution can be measured by ICP spectrophotometric analysis (JIS K1200-6 (2000)) or the like, and the measurement device includes commercially available devices such as ULITIMA manufactured by HORIBA, Ltd.

(Internal Cross-Linking Agent)

According to the present invention, the aqueous monomer solution contains an internal cross-linking agent. As a result, the water absorbing performance of the water absorbent resin to be obtained can be enhanced. Examples of the internal cross-linking agent include, although not specifically limited, an internal cross-linking agent having a thermally degradable skeleton or a (poly)ethylene glycol skeleton such as N,N'-methylenebis(meth)acrylamide, (poly) ethylene glycol di(meth)acrylate, (poly)propylene glycol di(meth)acrylate, trimethylolpropane tri(meth)acrylate, glycerin tri(meth)acrylate, glycerin acrylate methacrylate, ethylene oxide modified trimethylolpropane tri(meth)acrylate, pentaerythritol hexa(meth)acrylate, triallyl cyanurate, triallyl isocyanurate, triallyl phosphate, triallyl amine, poly (meth)allyloxy alkane, (poly)ethylene glycol diglycidyl ether, glycerol diglycidyl ether, ethylene glycol, polyethylene glycol, propylene glycol, glycerin, 1,4-butanediol, pentaerythritol, ethylene diamine, ethylene carbonate, propylene carbonate, polyethylene imine, and glycidyl (meth) acrylate. Of those, the internal cross-linking agent having a thermally degradable skeleton or a (poly)ethylene glycol skeleton is preferably used. The internal cross-linking agent may be used either singly or in combination of two or more types in consideration of the reactivity. Among them, using the compound with two or more polymerizable unsaturated groups is preferable. Meanwhile, the internal cross-linking agent may be added to a reaction system all at once, or may be added in divided portions.

The used amount of the internal cross-linking agent may be suitably determined depending on desired physical properties of the water absorbent resin. However, relative to the acrylic acid (salt)-based monomer excluding the internal cross-linking agent, it is preferably 0.001 to 5% by mol, more preferably 0.005 to 2% by mol, and still more preferably 0.01 to 1% by mol. When the used amount is less than 0.001% by mol, water soluble component is high in the water absorbent resin to be obtained, and thus the water absorption amount under load may not be guaranteed at sufficient level. On the other hand, when the used amount is higher than 5% by mol, the cross-linking density of the water absorbent resin to be obtained becomes high so that the water absorption amount may be insufficient.

(Surfactant)

From the viewpoint of water absorbing performance of the water absorbent resin to be obtained by the present invention (in particular, enhancing the water absorbent speed), a surfactant may be used. Examples of the surfactant include, although not specifically limited, the surfactant disclosed in WO 97/017397 A, U.S. Pat. No. 6,107,358, or the like. Specific examples thereof include a non-ionic surfactant, an anionic surfactant, a cationic surfactant, an amphoteric surfactant, and the like. The surfactant may also have reactivity or polymerizing activity with the acrylic acid (salt)-based monomer or water absorbent resin. Used amount of the surfactant is not specifically limited. However, it is preferably 0 to 30% by weight, and more preferably 0.001 to 20% by weight relative to the acrylic acid (salt)-based monomer.

(Chelating Agent)

The aqueous monomer solution of the present invention may contain a chelating agent. Accordingly, the color stability (i.e., color stability of the polyacrylic acid (salt)-based water absorbent resin when stored under high temperature and high humidity condition for a long period of time) or leak resistance (prevention for gel deterioration) of the water absorbent resin can be improved. The chelating agent may be added to the hydrogel after polymerization or the water absorbent resin powder after drying. Preferably, it may be also added to the aqueous monomer solution. Meanwhile, various chelating agents described in paragraphs [0090] to [0096] of JP 2012-031292 A can be also applied to the present invention.

Further, addition amount of the chelating agent is, although not specifically limited, preferably 5 to 5000 ppm, more preferably 10 to 1000 ppm, and still more preferably 50 to 1000 ppm relative to the acrylic acid (salt)-based monomer. It may be particularly preferably contained at 100 to 1000 ppm.

(Polymerization Initiator)

A polymerization initiator to be used for the present invention is not specifically limited and can be selected properly in accordance with the polymerization mode. Examples may include a photodecomposition type polymerization initiator, a heat decomposition type polymerization initiator, a redox type polymerization initiator, and the like.

In particular, examples of the photodecomposition type polymerization initiator may include benzoin derivatives, benzyl derivatives, acetophenone derivatives, benzophenone derivatives, azo compounds, and the like. Further, examples of the heat decomposition type polymerization initiator may include persulfate such as sodium persulfate, potassium persulfate, and ammonium persulfate, peroxides such as hydrogen peroxide, tert-butyl peroxide, methyl ethyl ketone peroxide, azo compounds such as 2,2'-azobis(2-amindinopropane) dihydrochloride, 2,2'-azobis[2-(2-imidazolin-2-yl)propane]dihydrochloride, and the like. Further, examples of the redox type polymerization initiator may include the above-mentioned persulfate or peroxides in combination with reducing compounds such as L-ascorbic acid and sodium hydrogen sulfite. Combination use of the photodecomposition type polymerization initiator and the heat decomposition type polymerization initiator can also be exemplified as a preferable embodiment.

The used amount of these polymerization initiators may be preferably 0.0001 to 1% by mole and more preferably 0.0005 to 0.5% by mole relative to the above mentioned acrylic acid (salt)-based monomer. In the case where the used amount of the polymerization initiator is more than 1% by mole, color hue of water absorbent resin may deteriorate. For a case in which the amount is lower than 0.0001% by mole, it may result in increase of the residual monomer.
(Polymerization Method)

The polymerization method used in the method for producing the water absorbent resin of the present invention includes spray polymerization, liquid drop polymerization, bulk polymerization, precipitation polymerization, aqueous solution polymerization, reversed phase suspension polymerization or the like. For achieving an object of the present invention, aqueous solution polymerization using an aqueous monomer solution is preferable.

Meanwhile, the aqueous solution polymerization is a method of polymerizing an aqueous monomer solution without using a dispersion solvent. It is described in, for example, U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264,495, U.S. Pat. No. 5,145,906, and U.S. Pat. No. 5,380,808, and EP 0811636, EP 0955086, and EP 0922717, or the like.

Further, as the aqueous solution polymerization used in the present invention, preferably kneader polymerization or belt polymerization, more preferably continuous aqueous solution polymerization, still more preferably high concentration continuous aqueous solution polymerization, and particularly preferably high concentration and high temperature initiated continuous aqueous solution polymerization are employed. As described herein, the "high concentration" indicates a case in which the monomer concentration is 35% weight or higher in the aqueous monomer solution. Preferably, it is 40% by weight or higher, and more preferably 45% by weight or higher (upper limit is saturation concentration). Further, the "high temperature initiated" indicates a case in which the polymerization start temperature is 40° C. or higher. Preferably, it is 50° C. or higher, more preferably 60° C. or higher, and still more preferably 70° C. or higher (upper limit is the boiling point of the aqueous monomer solution).

As the continuous aqueous solution polymerization, continuous kneader polymerization described in U.S. Pat. No. 6,987,171, U.S. Pat. No. 6,710,141 or the like, and continuous belt polymerization described in U.S. Pat. No. 4,893,999, U.S. Pat. No. 6,241,928, US 2005/215734 A or the like can be mentioned. According to those aqueous solution polymerizations, the water absorbent resin can be produced with high productivity. Meanwhile, the polymerization apparatus used for the polymerization step is not particularly limited if it may be used for performing various polymerizations. However, for continuous belt polymerization, a continuous belt type reaction device is preferably used, and for continuous kneader polymerization, a continuous kneader is preferably used.

The polymerization step of the present invention may be performed under any conditions of normal pressure, reduced pressure, or increased pressure. Preferably, it is performed under normal pressure (or pressure around it, i.e., atmospheric pressure ±10 mmHg in general). Further, to improve physical properties by promoting polymerization, a deaeration step for removing dissolved oxygen (e.g., step for substituting with inert gas) may be included during the polymerization, if necessary. Further, the temperature at the start of the polymerization may vary depending on the type of the polymerization initiator used. However, it is preferably 15 to 130° C., and more preferably 20 to 120° C.

The production method of the present invention allows favorable control in large scale production. In the present invention, from this point of view, the production amount of the water absorbent resin is preferably 1 [t/hr] or higher, more preferably 1.5 [t/hr] or higher, still more preferably 2 [t/hr] or higher, and particularly preferably 3 [t/hr] or higher per single line. Upper limit of the production amount is not particularly limited, and it may be suitably determined, for example, 10 [t/hr] or the like. Meanwhile, the single line indicates a series of steps for producing the water absorbent resin, and when the steps are divided, it is defined as a throughput by a surface cross-linking step (single device).

Further, if necessary, the hydrogel discharged from a polymerization apparatus may be stored for aging or the like, separately from the following steps (gel-crushing step and drying step).

(2-2) Gel-Crushing Step

This step is a step for obtaining particulate hydrogel by gel-crushing of hydrogel obtained during the polymerization or after polymerization (or after storage following the polymerization) described above. Meanwhile, to distinguish from the "pulverizing" of (2-5) Pulverizing step and classification step, the operations of this step are referred to as "gel-crushing."

According to the present invention, the hydrogel after polymerization which is supplied to a drying step with an aid of a traverse conveyor is gel-crushed to a particulate state either during polymerization or after polymerization, and thus a particulate water-containing gel-like cross-linked polymer (hereinafter, also simply referred to as "particulate hydrogel") is obtained. Herein, the gel-crushing is preferably performed such that the weight average particle diameter (D50) of the particulate hydrogel is 0.1 to 5 mm. In the present invention, the particulate hydrogel can be directly obtained without performing gel-crushing by a polymerization method such as reversed phase suspension polymerization, spray polymerization, and liquid drop polymerization. However, according to those polymerization methods, overflow of the particulate hydrogel from the continuous through-flow belt-type dryer described below, reduction in water absorbent speed or the like is observed. Thus, gel-crushing is performed in the present invention. According to the gel-crushing, amorphous gel or aggregated gel is obtained, and thus gel overflow from the continuous through-flow belt-type dryer can be reduced and, due to surface area increase caused by gel-crushing (compared to a case with the same particle diameter), water absorbent speed is improved.

In the present invention, the method for gel-crushing is not particularly limited if the particle size of the particulate hydrogel can be controlled as described below. If the polymerization step is kneader polymerization, for example, it is preferable that the hydrogel be subjected to gel-crushing during polymerization. If the polymerization step is belt polymerization, it is preferable that the hydrogel be subjected to gel-crushing after polymerization. Meanwhile, even when the polymerization step is kneader polymerization, gel-crushing may be separately performed after polymerization.

Examples of the gel-crusher that is used in the present invention include, but not limited thereto, a gel-crusher equipped with plural rotating stirring wings such as batch type or a continuous type twin-arm kneader, a mono-axial or bi-axial extruder such as meat chopper, or the like. Among them, a screw type extruder having a porous plate at tip is preferable. The screw type extruder described in JP 2000-

063527 A and the gel-crushing method described in WO 2009/132958 A can be mentioned.

Among them, in the present invention, from the viewpoint of production efficiency or conveyability, the particulate hydrogel is preferably obtained by gel-crushing during kneader polymerization or gel-crushing after polymerization by using a screw type extruder having a porous plate (e.g., meat chopper).

Further, during the gel-crushing, water, the water absorbent resin powder or other additives (e.g., chelating agent, reducing agent, oxidation preventing agent and the like) may be suitably added. The addition amount is preferably 0.1 to 100% by weight relative to weight of the hydrogel.

With regard to the gel-crushing step of the present invention, temperature of the hydrogel before gel-crushing (i.e., gel temperature) is preferably 60 to 120° C., and more preferably 65 to 110° C. from the view point of particle size control and physical properties. When the gel temperature is lower than 60° C., the gel hardness is increased due to characteristics of the hydrogel, and thus it may be difficult to control the particle shape or particle size distribution during gel-crushing. On the other hand, when the gel temperature is higher than 120° C., softness of the hydrogel is increased, and thus it may be difficult to control the particle shape or particle size distribution. Meanwhile, the gel temperature may be controlled by temperature during polymerization, or heating, incubating, cooling or the like after polymerization.

The weight average particle diameter (D50) (defined by sieve classification) of the particulate hydrogel that is obtained by gel-crushing of the present invention is preferably 0.1 to 5 mm, more preferably 0.3 to 3 mm, and particularly preferably 0.5 to 2 mm. Further, the ratio of coarse particulate hydrogel having particle diameter of 5 mm or higher is preferably 10% by weight or less relative to the entire particulate hydrogel. More preferably, it is 5% by weight or less, and still more preferably 1% by weight or less. When the particle size of the particulate hydrogel is not within the range, gel adhesion to a traverse conveyor, reduction in drying efficiency during drying step or the like may cause reduced productivity or difficult control of particle size of the water absorbent resin, and therefore undesirable.

In the present invention, as an exemplary method for controlling the particulate hydrogel to have the particle size described above, gel-crushing disclosed in pamphlet of WO/2011/126079 [PCT/JP 2011/058829 (application date; Apr. 7, 2011)], in particular gel-crushing having "gel grinding energy (GGE)" of 18 to 60 [J/g] and/or gel-crushing to increase "weight average molecular weight of water soluble components in hydrogel" by 10,000 to 500,000 [Da] is preferably used.

For controlling the "gel grinding energy (GGE)" and/or "weight average molecular weight of water soluble components in hydrogel", the method described in the aforementioned international publication and its priority application (including foreign applications) such as using a screw type extruder having a porous plate at tip and having the hydrogel temperature of 60 to 120° C. and CRC (water absorption capacity without load) of 10 to 32 [g/g] before gel-crushing can be applied. Further, when a meat chopper or a mono-axial or a biaxial-extruder is used, particle size of the particulate hydrogel can be controlled based on screw revolution number, L/D ratio, hole diameter of dice, and addition of lubricants, or the like.

(Particulate Water-Containing Gel-Like Cross-Linked Polymer (Particulate Hydrogel))

According to the present invention, the particulate hydrogel after gel-crushing is, if necessary, stored and then supplied to the continuous through-flow belt-type dryer (drying step) with an aid of a traverse conveyor (gel transporting step). As for the temperature of the particulate hydrogel before supply to the drying step, it is preferably 50° C. or higher, more preferably 50 to 120° C., still more preferably 50 to 100° C., and particularly preferably 60 to 100° C. Meanwhile, the temperature of the particulate hydrogel can be controlled by the following method. Meanwhile, when the particulate hydrogel after gel-crushing is stored, it is preferably heated or incubated within the temperature range described above to promote polymerization, and it is also preferable to store it under reduced pressure or inert gas stream. Further, the storing is suitably performed by using a hopper or the like and the storing time is suitably selected from 0.5 minutes to 3 hours or so. It is also possible that, without any storing, the polymerization apparatus or gel-crusher is connected to a traverse conveyor (gel transporting step), and drying step.

Method 1; a method by which the gel-crusher is heated in advance such that the temperature of the particulate hydrogel is within the above range during the gel-crushing step and within 20 minutes, preferably within 10 minutes, and more preferably within 5 minutes after the gel-crushing, it is loaded on the traverse conveyor.

Method 2; a method by which at least one of the polymerization apparatus, gel-crusher, storage tank after gel-crushing (gel storage tank), and traverse conveyor is heated or incubated so as not to lose the reaction heat for the polymerization step.

The neutralization rate of the particulate hydrogel is within the range described in section (2-1) described above, and preferably, from the viewpoint of enhancing the transporting property of the gel to the continuous through-flow belt-type dryer and physical properties accompanied with homogeneous drying or the like, 60% by mol or higher, preferably 61 to 100% by mol, more preferably 65 to 90% by mol, and still more preferably 65 to 75% by mol. As described above, when the neutralization rate is not within the above range, performances such as the gel transporting property, water absorption capacity, water absorbent speed, residual monomers, coloration, and physical properties or reactivity after surface cross-linking may be reduced, and therefore undesirable. The method for controlling the neutralization rate is not particularly limited. However, there is, for example, a method of performing polymerization after adjusting the aqueous monomer solution to the above range, a method of adjusting the hydrogel after polymerization or the like. Examples of the preferred control method include those described in U.S. Pat. No. 5,210,298, WO 00/22017 A or the like. Meanwhile, the neutralization rate of the particulate hydrogel is defined by the neutralization rate of the acid group in polymer side chains, and the measurement of the neutralization rate is performed according to the method described in WO 2008/96713 A.

(Water Soluble Component and Water Absorption Capacity of Particulate Water-Containing Gel-Like Cross-Linked Polymer (Particulate Hydrogel))

From the viewpoint of enhancing the transporting property of hydrogel and physical properties after drying, the water soluble component in the particulate hydrogel (hereinafter, it may be also referred to as "gel Ext") is 10% by weight or less, preferably in the order of 7% by weight or less, 6% by weight or less, 5% by weight or less, 3% by weight or less, and particularly preferably 2% by weight or less. When the water soluble component is higher than 10% by weight in the hydrogel, the adhesiveness of the hydrogel is increased to induce lower transporting property or the like, and therefore it is undesirable. Meanwhile, the water soluble component of the hydrogel can be suitably adjusted based on an amount of the cross-linking agent during polymerization or the like.

According to the present invention, it is also preferable to reduce the water soluble component of the hydrogel during the polymerization step while increasing it after the drying step. In other words, it is preferable that the water soluble component in the particulate hydrogel obtained by gel-crushing of the hydrogel be 10% by weight or less, less than 10% by weight, or 7% by weight or less and the water soluble component be increased after the drying step.

Meanwhile, the water absorption capacity (CRC or FSC) and the water soluble component (Ext) exhibit positive correlation, and thus the water absorption capacity decreases as the water soluble component decreases. Thus, in a commercially available water absorbent resin, water soluble component is contained at 10 to 30% by weight or so from the viewpoint of a balance with water absorption capacity.

Specifically, for the polymerization step, the adhesiveness of the hydrogel is preferably reduced by lowering the water soluble component in the hydrogel, and also the water absorption capacity is enhanced by increasing water soluble component in the particulate hydrogel after the drying step.

Meanwhile, examples of the method for enhancing the water absorption capacity after the drying step which may be used include, although not specifically limited, use of a thermally degradable internal cross-linking agent, use of a polymer main chain breaker (for example, oxidizing agent) or the like. Among them, use of an internal cross-linking agent having a thermally degradable skeleton or (poly)alkylene glycol skeleton is preferable. Examples of the internal cross-linking agent having a thermally degradable skeleton include dimer acrylate, polyvinyl azo compound or the like which is disclosed in U.S. Pat. No. 5,389,722, an asymmetric polyvinyl cross-linking agent such as 3-methyl-1,3-butanediol diacrylate disclosed in WO 2006/062609 A, and the like. Examples of the internal cross-linking agent having a (poly)alkylene glycol skeleton, and preferably (poly)ethylene glycol skeleton include (poly)ethylene glycol-based multi-functional acrylate, (poly)ethylene glycol-based multi-functional polyglycidyl compound and the like. Among them, the multi-functional (poly)ethylene glycol compound is preferable. The multi-functional polyethylene glycol compound is more preferable. The multi-functional polyethylene glycol (meth)acrylate is still more preferable. The multi-functional polyethylene glycol acrylate is particularly preferable. Herein, the average number n of the EO unit in (poly) ethylene glycol is preferably 1 or more, more preferably 4 to 200, still more preferably 8 to 100, and particularly preferably 8 to 25. When the average number n is small, the increase in water absorption capacity caused by heating is small in non-acrylate. On the other hand, when the average number n is excessively high, it is disadvantageous in terms of cost.

Further, increase amount of the water soluble component in hydrogel (Water soluble component after drying−Water soluble component in hydrogel) is preferably higher than 0.1% by weight (upper limit is 20% by weight or less), more preferably 1 to 10% by weight, still more preferably 1 to 15% by weight, further still more preferably 2 to 10% by weight, and particularly preferably 3 to 8% by weight. When the increase amount of the water soluble component is small, the water absorption capacity of the obtained water absorbent resin may be reduced. On the other hand, when the increase amount of the water soluble component is excessively high, gel strength or durability (leak resistance and light resistance) of the obtained water absorbent resin may be reduced.

In the present invention, the water absorption capacity of the particulate hydrogel (hereinafter, referred to as "gel CRC") is, although not specifically limited, preferably less than 30 [g/g], and the gel CRC after increase in water soluble component is within the range described below, in particular, preferably 30 to 50 [g/g], and more preferably 32 to 45 [g/g] before surface cross-linking.

Further, in the present invention, the moisture content of the particulate hydrogel is, although not specifically limited, preferably 20 to 80% by weight, more preferably 20 to 75% by weight, and still more preferably 30 to 70% by weight.

Specifically, unlike the first process, as a method of not controlling the belt temperature of the traverse conveyor to 40 to 120° C., the method for producing the polyacrylic acid (salt)-based water absorbent resin (the second process) of the present invention includes a polymerization step of polymerizing an aqueous monomer solution containing a polymerization inhibitor, acrylic acid (salt), and an internal cross-linking agent to obtain a water-containing gel-like cross-linked polymer, a gel-crushing step of performing the gel-crushing of the water-containing gel-like cross-linked polymer simultaneously with or subsequent to the polymerization to obtain a particulate water-containing gel-like cross-linked polymer, and a drying step of supplying the particulate water-containing gel-like cross-linked polymer to a continuous through-flow belt-type dryer by a traverse conveyor to dry the particulate water-containing gel-like cross-linked polymer, in which the water soluble component in the particulate water-containing gel-like cross-linked polymer is 10% by weight or less and the water soluble component is increased after the drying step.

As a method of increasing the content of the water soluble component, the aforementioned internal cross-linking agent is used and it is heated after the following drying step within the range described below. The method for increasing the water soluble component is not particularly limited. Preferably, increasing the water soluble component is performed by heating during the drying step described below. Further, increasing the water soluble component may be achieved by heating during the surface cross-linking step as well as the drying step. A method of breaking the main chain of the water absorbent resin by using UV, an oxidizing agent or the like is also included. Thus, even for the second production method, the belt surface temperature is preferably 40 to 120° C., and thus the first production method is also applicable.

(2-3) Gel Transporting Step

The present step is a step for transporting the particulate hydrogel to supply the particulate water-containing gel-like cross-linked polymer (particulate hydrogel) obtained from the gel-crushing step (including an optional storing step after gel-crushing) to the continuous through-flow belt-type dryer that is used for the following drying step.

(Covering (Cover))

According to the present invention, the belt temperature of the traverse conveyor is controlled within a pre-determined temperature range. From the viewpoint of temperature control, preventing incorporation of foreign materials, improving working environment, coloration or physical properties of the water absorbent resin and the like, the main body of the traverse conveyor is preferably connected to the dryer (preferably, a continuous through-flow belt-type dryer)

while it is in a practically covered state. Specifically, also provided by the present invention is an apparatus for producing a water absorbent resin having a traverse conveyor and a continuous through-flow belt-type dryer, in which the main body of the traverse conveyor is connected to the continuous through-flow belt-type dryer while the main body of the traverse conveyor is in a practically covered state. It is also preferable that the inlet (entrance side) for the particulate hydrogel of the main body of the traverse conveyor be connected to a polymerization apparatus or a gel-crusher via pipes or the like and it have a covering (cover) in a non-open system (closed system for the hydrogel). More preferably, the polymerization apparatus for the water absorbent resin or gel-crusher is connected to the main body of the traverse conveyor in non-open system via a storage tank.

The main body of the traverse conveyor is preferably in an atmosphere of 30° C. or higher. The atmospheric temperature is preferably 30 to 120° C., more preferably 30 to 90° C., still more preferably 35 to 88° C., and particularly preferably 40 to 85° C. Further, the atmospheric dew point is preferably 20 to 100° C., more preferably 30 to 80° C., and still more preferably 40 to 70° C. For such reasons, if necessary, for controlling the atmospheric temperature of the main body of the traverse conveyor to the range described above, a unit for heating or incubating the belt contact surface or upper space of the traverse conveyor is additionally installed.

The atmospheric pressure near the traverse conveyor is not particularly limited. It may be under increased pressure, normal pressure, or reduced pressure. It may be also in an atmosphere of inert gas. However, from the viewpoint of cost and easy operability, substantially normal pressure (atmospheric pressure ±10 mmHg) is preferable, and air atmosphere is preferable.

In this regard, a traverse conveyor connected to a continuous through-flow belt-type dryer is disclosed in FIG. 2 and FIG. 3 of Patent Literature 7 or FIG. 3.6 of Non-Patent Literature 1, in which the main body of the traverse conveyor illustrated in the drawings has a no cover and is used in an open system. Under such a state, it is influenced by outside air and it may be difficult to control the belt temperature, and therefore undesirable.

Meanwhile, "the main body of the traverse conveyor is in a practically covered state" represents that, separately from that the main body of the traverse conveyor is present inside, the traverse conveyor is stored in a box or a small chamber or under a covering (cover) when it is present inside or outside, in particular, inside. The storage volume is preferably 1 to 100 times the volume defined by the size of the traverse conveyor, and it may be stored in a box or a small chamber or under a covering (cover) with volume of from 1.5 to 10 times. If the main body of the traverse conveyor is stored together with a part of the continuous through-flow belt-type dryer in a box or a small chamber or under a covering (cover), the storage volume is preferably 10 to 10000 times the volume defined by the size of the traverse conveyor, and it may be stored in a box or a small chamber or under a covering (cover) with volume of from 200 to 5000 times.

Figure 4:
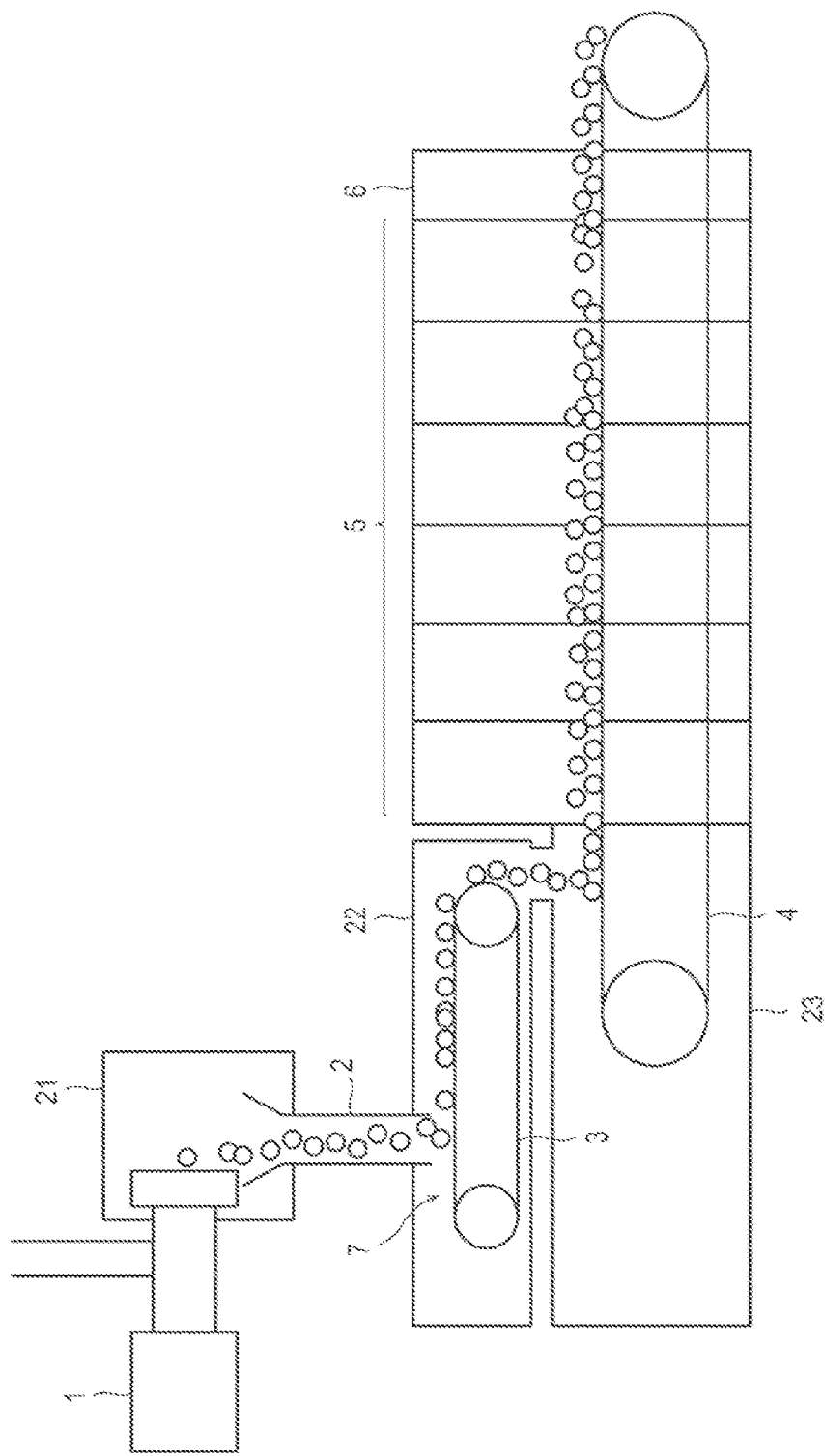
FIG. 4 is a schematic cross-sectional view of a production apparatus according to a third embodiment in which a cover is added on a part of the traverse conveyor and dryer and also the exit of the meat chopper that are shown in FIG. 1.

Meanwhile, as a typical example of "the main body of the traverse conveyor is in a practically covered state", those illustrated in FIG. 3 or FIG. 4 can be mentioned, but it is not limited thereto. Specifically, as illustrated in FIG. 3, there may be a configuration in which a part of the traverse conveyor and the dryer is covered with the covering (cover) 20 and the exit of the meat chopper is covered with the covering (cover) 21. In addition, according to a more preferred mode illustrated in FIG. 4, the traverse conveyor is covered with the covering (cover) 22, a part of the dryer is covered with the covering (cover) 23, main body of the traverse conveyor is connected to the continuous through-flow belt-type dryer (hot air dryer), and the inlet (entrance side) for the particulate hydrogel of the main body of the traverse conveyor is connected to the polymerization apparatus or outlet (exit side) of the gel-crusher in a non-open system. It is preferable that the traverse conveyor, the continuous through-flow belt-type dryer, and the gel-crusher are connected to each other in a non-open system.

(Belt Speed and Speed Ratio Against Dryer Belt)

In the present invention, the belt speed of the traverse conveyor is, although not specifically limited, preferably 0.1 to 10.0 [m/s], more preferably 0.1 to 5.0 [m/s], still more preferably 0.1 to 2.0 [m/s], particularly preferably 0.1 to 1.5 [m/s], and most preferably 0.1 to 1.0 [m/s]. When the belt speed is higher than 10.0 [m/s], drying efficiency may be lowered due to scattering of the particulate hydrogel. On the other hand, when the belt speed is lower than 0.1 [m/s], thermal deterioration of the particulate hydrogel or performance reduction of the water absorbent resin may be caused during the drying step, and therefore undesirable.

Further, from the viewpoint of stable supply to the drying step as a step following the gel transporting step, when a belt conveyor, in particular the continuous through-flow belt-type dryer (another name: circulating air band dryer), is used for the dryer, the belt speed of the traverse conveyor preferably has higher speed than the belt speed of the dryer. Specifically, it is preferably 1.01 to 500 times, more preferably 1.1 to 200 times, still more preferably 3 to 100 times, and particularly preferably 5 to 50 times. When the belt speed ratio is lower than 1.01 times, the gel transport may not be evenly performed. On the other hand, when it is higher than 500 times, release of the particulate hydrogel from the belt conveyor may become insufficient.

Further, for scattering the particulate hydrogel from the traverse conveyor to the continuous through-flow belt-type dryer, the particulate hydrogel may be scattered to an end region of the dryer belt (end region that is ⅕ or less, further 1/10 or less of the entire belt length). For such a case, hot air may be supplied to a region for scattering. Preferably, scattering is performed under down flow (air flow in top to bottom direction). More preferably, scattering is performed without any air flow, and thus the particulate hydrogel can be more evenly scattered.

(Belt Tilt Angle)

The belt tilt angle of the traverse conveyor of the present invention is, although not particularly limited, preferably less than ±10°, more preferably less than ±5°, and still more preferably less than ±1° when it is 0° in the horizontal direction. Meanwhile, the lower limit of the belt tilt angle is 0° (substantially horizontal). By having the belt tilt angle of the traverse conveyor within range described above, the productivity and drying efficiency are increased.

(Maximum Traverse Angle)

The maximum traverse angle of the traverse conveyor of the present invention is determined by effective length of the traverse conveyor and effective width of the belt of the dryer (preferably, continuous through-flow belt-type dryer). From the viewpoint of easy control, it is preferably 10 to 60°, and more preferably 15 to 45°. When the maximum traverse angle is less than 10° and the particulate hydrogel needs to be scattered to both ends of the drying belt, a long traverse conveyor may be required, and therefore undesirable. Meanwhile, when the maximum traverse angle is more than 60°, height of a gel layer scattered on both ends of the drying belt may be increased, and therefore undesirable. Meanwhile, the maximum traverse angle of 10° represents that the traverse conveyor shows rotatory movement in a direction which is within the range of from −10 to +10° compared to the advancing direction of the dryer belt.

(Belt Width, Belt Thickness, Shape or the Like)

Belt width of the traverse conveyor of the present invention depends on performance of a polymerization apparatus (production performance). However, from the viewpoint of production of hydrogel, prevention of serpentine glide of belt, performance of the water absorbent resin and the like, it is preferably 0.1 to 1 m, more preferably 0.1 to 0.8 m, still more preferably 0.1 to 0.7 m, and particularly preferably 0.1 to 0.5 m. Further, from the above points of view, the belt thickness can be suitably designed within the range of preferably from 0.1 to 10 mm, and more preferably from 0.5 to 5 mm. Further, there may be irregularities or patterns (for example, cross or diamond shape etc.) formed on the belt surface, if required. Further, with regard to the shape, it may be a flat belt or may have a curved trough (in particular, both ends of a cross-section are curved upward). Although there may be bumps at both ends, a flat belt is preferably used. Meanwhile, color of the belt surface is not particularly limited and it may be suitably selected from white, blue, black, or the like.

(Belt Material)

Belt material (surface material) of the traverse conveyor of the present invention is, although not specifically limited, preferably the one having a contact angle with respect to water of 60° or higher and heat deflection temperature of 20° C. or higher. When those properties are maintained, the belt may be composed of a single material or a composite material. It may be one type selected from resin such as polyethylene, polypropylene, polyester, polyisobutylene, halogenated polyolefin, polyamide, polyimide, polyurethane, polyacetal, polyvinyl chloride, an epoxy resin, a silicone resin, a fluoro resin, and natural or synthetic rubber, or the like. Among them, the surface material of the traverse conveyor belt is preferably polyethylene, polypropylene, polyester, polyamide, polyimide, polyurethane, polyacetal, a fluoro resin, polyvinyl chloride, an epoxy resin, or a silicone resin. A silicone resin and a halogenated polyolefin resin are more preferable. A silicone resin and a fluoro resin such as fluorinated polyolefin are particularly preferable.

Although the traverse conveyor belt may be constructed of the above material, it may have a composite form in which a monolayer or a multilayer is added on a core material such as aramide canvas, polyester canvas, and polyester sheet. A belt coated with the resin described above such as a belt obtained by coating polyvinyl chloride on a polyester sheet is preferable. A stainless steel belt coated with the resin or the like, a composite belt obtained by impregnating glass cross or resin fiber cross with the resin, and the like are more preferably used.

(Belt Surface Roughness)

Belt surface roughness (Rz) (JIS B 0601-2001) of the traverse conveyor of the present invention is, although not specifically limited, preferably 800 nm or lower, and more preferably in the order of 500 nm or lower, 300 nm or lower, 200 nm or lower, and 185 nm or lower. Most preferably, it is 170 nm or lower. Meanwhile, the lower limit of the surface roughness (Rz) is, although not specifically limited, 10 nm or higher, and preferably 20 nm or higher. Further, the belt surface roughness (Ra) (JIS B 0601-2001) is preferably 250 nm or lower, and more preferably 200 nm or lower. The surface roughness can be measured by using a Stylus type surface roughness tester with reference to JIS B 0651-2001. As a unit for controlling the surface roughness, buff polishing, electrolytic polishing, or the like of a stainless steel can be used, for example. The traverse conveyor belt is constructed of various materials. A good flexural strength, flexibility, and good fatigues strength under repeated bending stress are required, and thus stainless steel is preferable.

(Temperature Control)

According to the present invention, the traverse conveyor is controlled to the temperature the same or lower than the temperature of the particulate hydrogel. When the temperature is higher than that of the particulate hydrogel, gel adhesion onto the traverse conveyor belt may increase.

The belt temperature (surface temperature) of the traverse conveyor is, although not specifically limited, 40 to 120° C., preferably 50 to 120° C., more preferably 50 to 100° C., still more preferably 60 to 100° C., and particularly preferably 60 to 95° C. Further the temperature difference between the belt temperature of the traverse conveyor and the temperature of the particulate hydrogel on the belt is preferably 0 to 30° C., more preferably 0 to 10° C., and still more preferably 0 to 5° C. If the belt temperature is lower than 40° C., the particulate hydrogel is adhered on the traverse conveyor including a belt or the like, and therefore undesirable. On the other hand, if the belt temperature is higher than 120° C., the particulate hydrogel is partially dried to yield adhesion to dried polymer, or it may cause a problem during the drying step. Further, heating at the temperature higher than 120° C. is disadvantageous in terms of facilities, operation, and cost. Meanwhile, the belt temperature of the traverse conveyor is measured right before the area for supplying the particulate hydrogel. The thermometer to be used is not particularly limited if it can be used for measuring surface temperature of the belt. A commercially available contact type or non-contact type thermometer is used.

In Patent Literature 2, a technique of cooling the internal surface of the polymerization apparatus (in particular, to 30° C. or lower) is disclosed for preventing adhesion of hydrogel during polymerization of the water absorbent resin (claims 1, 14, and 15, and Examples 1 to 6). However, according to the present invention, the belt temperature of the traverse conveyor is heated to or maintained at 40 to 120° C. during the gel transporting step so as to improve gel transporting property after polymerization.

Further, as more preferred temperature control for the gel transporting step, after controlling the belt temperature and the temperature difference between the particulate hydrogel and the belt to the range described above, the temperature of the particulate hydrogel is controlled preferably to 50° C. or higher, more preferably 50 to 120° C., still more preferably 60 to 100° C., and particularly preferably 60 to 95° C. By performing the temperature control within the above range during the gel transporting step, adhesion of the particulate hydrogel to the traverse conveyor or the like may be prevented. Meanwhile, as a method for controlling the belt temperature of the traverse conveyor to the above range, there can be a method of directly heating the device (for example, heating with hot air, infrared ray, jacket, hot water or the like from the back surface of the belt after gel release), heat transfer of hydrogel after polymerization, or a method of covering the traverse conveyor, in particular covering at the atmospheric temperature of 30° C. or higher.

Meanwhile, as a unit for controlling the atmospheric temperature, it is possible to install a covering (cover) over the traverse conveyor and heat or incubate it appropriately. In addition, as a unit for heating a space present above the traverse conveyor, as illustrated in FIG. 3, the traverse conveyor and the dryer (preferably, the continuous throughflow belt-type dryer; ditto for the followings) may be covered with the same covering (cover) so that part of the heat of hot air used in the dryer may be used.

(Gel Layer Height of Particulate Hydrogel)

In the present invention, gel layer height of the particulate hydrogel that is loaded on top of the traverse conveyor belt indicates average cross-sectional height in advancing direction of the belt (gel layer height), and it is controlled to preferably 3 to 30 cm, more preferably 5 to 30 cm, still more preferably 5 to 20 cm, particularly preferably 6 to 15 cm, and most preferably 7 to 12 cm. As described herein, the average cross-sectional height can be defined by averaging the cross-sectional height between two ends of the cross-section of the gel layer (commonly, 0 cm high) which includes the maximum height of the gel layer (commonly, near the center).

To further solve the problems, the average cross-sectional height, in advancing direction of the belt, of the particulate hydrogel on the traverse conveyor is preferably the same or thinner than the gel thickness on the drying belt. Specifically, it is preferably 0.05 to 1.5 times, more preferably 0.1 to 1.0 times, still more preferably 0.5 to 0.9 times, and particularly preferably 0.6 to 0.8 times the gel thickness on the drying belt. Meanwhile, those values can be expressed as a fractional number, for example, 0.1 to 1.0 times corresponds to thickness of 1/10 to 1/1.

The method for controlling the height of gel layer is not particularly limited, and examples thereof include a method of scattering the particulate hydrogel onto the traverse conveyor belt while suitably controlling the positional relation between the outlet of the polymerization apparatus and the traverse conveyor and controlling the belt speed of the traverse conveyor to the above range. Meanwhile, if the scattered gel is flattened using a roller or the like as described in Patent Literature 10, it becomes difficult to control.

(Area Occupancy Rate of Particulate Hydrogel)

For achieving an object of the present invention, the area occupancy rate of the particulate hydrogel in width direction on the traverse conveyor belt is preferably 10 to 96%, more preferably 10 to 95%, still more preferably 10 to 90%, and particularly preferably 50 to 90% relative to the belt width. When the area occupancy rate is higher than 96%, the particulate hydrogel may spill over the traverse conveyor. On the other hand, when the area occupancy rate is lower than 10%, the main body of the traverse conveyor becomes unnecessarily big, and therefore undesirable. Meanwhile, in this specification, the "area occupancy rate of the particulate hydrogel in width direction on the traverse conveyor belt" indicates the value that is measured by the method described below.

(Measurement of Area Occupancy Rate of Particulate Hydrogel in Width Direction on Traverse Conveyor Belt)

The area occupancy rate of the particulate hydrogel in width direction on the traverse conveyor belt represents the ratio (%) obtained by dividing the occupancy area of the hydrogel, which is an area from the end point of hydrogel loading on the belt to the start of adding the particulate hydrogel to the dryer, by the total area of the belt loaded with the hydrogel. Specifically, when the belt area (total area of the belt loaded with the hydrogel) is (A) and the occupancy area of the hydrogel loaded on the belt area is (B), the value represented by the equation: (B/A)×100(%) is referred to as the area occupancy rate.

(Bulk Specific Gravity of Particulate Hydrogel)

In the present invention, the bulk specific gravity of the particulate hydrogel loaded on the traverse conveyor belt is preferably less than 0.8 [g/cm$^3$], and the lower limit is 0.4 [g/cm$^3$] or higher. The bulk specific gravity is obtained based on the weight of the particulate hydrogel loaded on the belt and the volume that is calculated from gel layer height of the particulate hydrogel in accordance with scanning using a laser type distance meter, a laser type displacement sensor, a ultrasonic type distance meter or the like, and belt width.

(Comparison with Conventional Method for Transporting Particulate Hydrogel)

Supplying the particulate hydrogel to the dryer with an aid of the traverse conveyor is described in Patent Literatures 1, 10 to 12, 14, and 15 as well as FIG. 3.6 of Non-Patent Literature 1 or FIG. 2 and FIG. 3 of Patent Literature 5. Among them, a technique of preventing gel adhesion by having belt speed of 0.4 [m/s] is disclosed in Patent Literature 11.

Although descriptions related to the traverse conveyor and belt speed are included in Patent Literatures and Non-Patent Literatures described above, there is no description or suggestion regarding the particle size control of the particulate hydrogel or the belt temperature of the traverse conveyor. In addition, there is no description or suggestion regarding the influence of operation condition of the traverse conveyor on the physical properties of the water absorbent resin. In addition, an embodiment of having the entire traverse conveyor covered with a covering (cover) is not disclosed in Patent Literatures and Non-Patent Literatures described above, and a traverse conveyor connected to a polymerization apparatus or a gel-crusher (entrance side) or a dryer (exit side) in practically non-open system is not disclosed, either. By using such a traverse conveyor, not only the control of belt surface temperature of the traverse conveyor can be easily achieved but also incorporation of foreign materials or the like into the particulate hydrogel is reduced and an excellent working environment is obtained.

(Air Contact Time)

From the viewpoint of preventing coloration of a water absorbent resin after drying or reducing residual monomers, the air contact time from gel-crushing to supply to the dryer is preferably short. Specifically, the air contact time from gel-crushing step to supply to the drying step is preferably 180 seconds or shorter. More preferably, it is 120 seconds or shorter. Still more preferably it is 60 seconds or shorter. Particularly preferably, it is 30 seconds or shorter. Further, the lower limit is determined by rotational speed [m/s] or length [m] of the traverse conveyor, and it is preferably 1 second or longer, more preferably 5 seconds or longer, and still more preferably 7 seconds or longer. When the contact time is long, coloration may be shown after drying, and therefore undesirable.

Further, as disclosed in Patent Literature 13 or FIG. 1 and FIG. 2 thereof, there is also a method of storing the particulate hydrogel before transporting to the dryer. However, as the air contact time is increased due to storing, it is undesirable. In this case, the storage tank may be sealed with inert gas or kept under reduced pressure.

(2-4) Drying Step

This step is a step for obtaining a dried polymer by drying particulate hydrogel obtained in the gel-crushing step followed by the gel transportation step. Herein, the moisture content in the particulate hydrogel to be dried (moisture content in the particulate water-containing gel-like crosslinked polymer corresponds to before-drying) is within the range described in the gel-crushing step and the moisture content is not substantially changed.

Hereinafter, the drying step is described in greater detail. When inside of the continuous through-flow belt-type dryer is divided into multiple chambers, the following condition may be the same or different from each other.

Examples of the drying devices used for the drying step include, although not specifically limited, one or two or more types of a heat transfer dryer, a radiation heating dryer, a hot air heating dryer, a dielectric heating dryer, and the like. Among the dryers, the hot air heating dryer (hereinafter, referred to as "hot air dryer") is particularly preferably used from the viewpoint of a drying speed. Examples of the hot air dryer encompass a circulating air belt (band) type hot air dryer, a circulating air circuit type hot air dryer, a vertical circulating air belt type hot air dryer, a parallel circulating air belt type hot air dryer, a circulating air tunnel hot air dryer, a circulating air groove stirring hot air dryer, a fluidized-bed hot air dryer, a flash hot air dryer, a spray hot air dryer, and the like. In the present invention, the circulating air belt type hot air dryer is preferably used from the viewpoint of control of physical properties of the water absorbent resin to be obtained. A circulating air belt type hot air dryer in continuous mode (hereinafter, referred to as a "continuous through-flow belt-type dryer") is particularly preferable.

Meanwhile, as for the various conditions of the continuous through-flow belt-type dryer such as belt speed, belt width, material, or surface roughness and drying method, disclosure of WO 2010/025012 A and WO 2010/025013 A and US 2008/214749 A etc. are preferably applied. Specifically, the belt speed of the continuous through-flow belt-type dryer has preferably the speed which satisfies the aforementioned speed ratio range against the belt speed of the traverse conveyor. More preferably, it is 0.001 to 9.9 [m/s], still more preferably 0.005 to 5.0 [m/s], and particularly preferable 0.01 to 1.0 [m/s].

(Drying Temperature)

Regarding the drying step of the present invention, the drying (hot air) temperature of the continuous through-flow belt-type dryer is preferably 110 to 230° C., more preferably 150 to 230° C., still more preferably 160° C. to 200° C., and particularly preferably 165 to 195° C. The drying (hot air) temperature set in the range of 110 to 230° C. makes it possible to reduce drying time and coloration of the water absorbent resin, and therefore desirable. Meanwhile, the drying temperature may be constant temperature within the range described above. Alternatively, it may be varied depending on drying state.

Further, to achieve an object of the present invention, by performing heating after the drying step for the second method, more preferably even for the first method, the water soluble component (Ext) can be increased to improve water absorption capacity (CRC). As an exemplary method for increasing the water soluble component, the hydrogel with low water soluble component and low water absorption capacity is synthesized preferably by using the internal cross-linking agent and, during the following drying step, it is heated and dried for a time described below at high temparature, preferably at 150 to 230° C., and more preferably at 160 to 200° C.

(Dew Point of Hot Air)

The hot air sent by the continuous through-flow belt-type dryer in the drying step of the present invention contains at least water vapor, and has a dew point of preferably 30 to 100° C., and more preferably 30 to 80° C. By controlling the dew point of hot air in the above range, it is possible to reduce residual monomers, and further prevent reduction in bulk specific gravity of the dried polymer. Note that the dew point is a value where the particulate hydrogel has moisture content of at least 10% by weight or more, preferably 20% by weight or more.

Further, in the drying step of the present invention, it is preferable that a dew point in the vicinity of the inlet of the dryer be higher than that in the vicinity of an outlet of the dryer from the viewpoint of residual monomers, absorbency, coloration, and the like. Specifically, it is preferable to expose the particulate hydrogel to hot air having a dew point higher by preferably 10 to 50° C., more preferably 15 to 40° C. By controlling the dew point in the above range, it is possible to prevent the reduction in the bulk specific gravity of the dried polymer.

(Wind Speed and Wind Direction)

During the drying step of the present invention, the wind speed of hot air sent by the continuous through-flow belt-type dryer is preferably 0.8 to 3.0 [m/s], more preferably 0.8 to 2.5 [m/s], and still more preferably 1.0 to 2.0 [m/s]. By having the wind speed within the range, moisture content in the dried polymer to be obtained can be controlled to a desired range, and the water absorbent resin obtained accordingly can improve water absorbent speed. Meanwhile, wind speed of the hot air may be constant within the range or may be suitably varied depending on drying state.

Further, the wind direction of hot air is preferably perpendicular to the circulating air belt surface, and using up-flow hot air and down-flow hot air in combination is more preferable. In particular, when the first part of the dryer has up-flow while the latter part of the dryer has down-flow, more even drying can be achieved.

(Drying Time)

In the drying step of the present invention, the drying time by the continuous through-flow belt-type dryer depends on the surface area of the particulate hydrogel, the specifications of the dryer, or the like. It may be suitably set to have desired moisture content. It is preferably between 10 and 120 minutes, and more preferably between 20 and 60 minutes.

Further, to achieve an object of the present invention, by heating the particulate hydrogel during the drying step for the second method, more preferably even for the first method, preferably at 150 to 230° C., and more preferably at 160 to 200° C. for the time described above, the water soluble component and water absorption capacity are preferably improved. It is also preferable to use hot air at the above temperature. In addition, it is also possible to cool the dried polymer by applying hot air at the predetermined temperature (preferably 40 to 80° C.) to the dried polymer after the drying step.

(Bulk Specific Gravity of Particulate Hydrogel)

The bulk specific gravity of the particulate hydrogel obtained from the gel-crushing step is slightly changed during the following gel transporting step, and the bulk specific gravity of the particulate hydrogel in undried state, which is loaded on the through-flow belt during the drying step, is preferably less than 0.7 [g/cm$^3$], more preferably less than 0.6 [g/cm$^3$], and still more preferably less than 0.55 [g/cm$^3$], and the lower limit is preferably 0.35 [g/cm$^3$] or higher.

Examples of a method for controlling bulk specific gravity of the particulate hydrogel during the drying step include a method of loading the particulate hydrogel on a through-flow belt by supplying the gel from a predetermined height. In such case, the bulk specific gravity is calculated based on the weight of the particulate hydrogel loaded on the through-flow belt and the volume of the loaded particulate hydrogel measured by scanning using a laser type distance meter or a laser type displacement sensor.

(2-5) Pulverizing Step and Classification Step

This step is a step for obtaining the water absorbent resin powder by, as necessary, pulverizing the dried polymer (that is, dried product of hydrogel or the like) obtained from the drying step (that is, pulverizing step) and controlling the particle size by classification (that is, classification step).

For more distinct exhibition of the difference in physical properties of the water absorbent resin obtained by the production method of the present invention, it is preferable to have, after the drying step, at least one step, particularly preferable to have all steps of the pulverizing step, the classification step, and the surface cross-linking step.

The pulverizing method is not particularly limited when it can pulverize the dried polymer obtained from the drying step. However, a conventionally known pulverizing apparatus such as a roll mill, a hammer mill, a roll granulator, a jaw crusher, a gyratory crusher, a cone crusher, a roll crusher, and a cutter mill can be used. From the viewpoint of particle size control, among them, it is particularly preferable to use a roll mill or a roll granulator in multistage.

In the classification, sieve classification, air classification or the like disclosed in, for example, U.S. Pat. No. 6,164,455, WO 2006/074816 A, WO 2008/037672 A, WO2008/037673 A, WO 2008/037675 A, and US 2010/032694 A etc. can be applied. Particles with undesired particle size are removed by the classification, and they are further pulverized or collected as fine powder, as necessary.

The particle size of the water absorbent resin powder (before surface cross-linking) is, in terms of weight average particle diameter (D50), preferably 200 to 600 µm, more preferably 200 to 550 µm, still more preferably 250 to 500 µm, and particularly preferably 350 to 450 µm. Further, content of the particles with particle size of less than 150 µm is preferably as small possible, and the content ratio is generally 0 to 5% by weight, preferably 0 to 3% by weight, and more preferably 0 to 1% by weight. In addition, the content of the coarse particles with particle size of 850 µm or higher is also preferably as small possible, and the content ratio is generally 0 to 5% by weight, preferably 0 to 3% by weight, and more preferably 0 to 1% by weight. Further, the ratio of the particles with particle size of 150 µm or more but less than 850 µm is preferably 95% by weight or more, and more preferably 98% by weight or more (upper limit is 100% by weight). Further, the logarithmic standard deviation ($\sigma\zeta$) of particle size distribution is preferably 0.25 to 0.45 and more preferably 0.30 to 0.40. The particle size is measured based on the measurement method disclosed in WO 2004/069915 A or ERT 420.2-02 by using a standard sieve (JIS Z8801-1 (2000)). However, control to specific particle size (weight average particle diameter (D50), particle size distribution or the like) is not limited to the classification step, and the control can be also suitably made by the pulverizing step, granulation step, fine powder recycling step or the like. Meanwhile, the particle size is also preferably applied to a water absorbent resin after surface cross-linking, and also to a final product.

Further, from the viewpoint of the physical properties of the water absorbent resin obtained by the present invention, the classification step is preferably performed before or after the surface cross-linking step. The sieve classification is particularly preferable. The classification before the surface cross-linking step (in general, the first classification step) is preferable in that it allows the control of the particle size of a final product to a desired range. In addition, the classification after the surface cross-linking step (in general, the second classification step) is preferable in that it allows production of a water absorbent resin with excellent performance as a result of removing coarse aggregated particles that are generated during mixing with the surface cross-linking agent or treatment by heating or removing fine particles that are generated by physical or mechanical disruption.

(2-6) Surface Cross-Linking Step

The present step is a step for enhancing liquid permeability (SFC) or water absorption capacity under load (AAP) of the water absorbent resin by surface cross-linking of the water absorbent resin powder obtained after the pulverizing step and the classification step. The "surface cross-linking" means cross-linking the surface or vicinity of the surface of the water absorbent resin powder. In addition, the expression "surface or vicinity of the surface" generally means a surface layer portion with thickness of several tens of µm or less, or a surface layer portion with thickness that is 1/10 of the total thickness, in which the thickness is suitably determined depending on an object.

Examples of the surface cross-linking method which may be used include, although not specifically limited, a method of cross-linking surface of a water absorbent resin powder by using a surface cross-linking agent (JP 2530668 B1), a method of surface cross-linking polymerization by adding a cross-linkable monomer to a water absorbent resin powder, a method of radical surface cross-linking by using a radical polymerization initiator, and the like. In particular, the surface cross-linking including high temperature heating is preferably applied.

(Surface Cross-Linking Agent)

Examples of covalent bonding surface cross-linking agent to be employed in the present invention include, although not specifically limited, various organic or inorganic surface cross-linking agents. Among them, organic surface cross-linking agents are preferable. Examples of the organic surface cross-linking agents include polyhydric alcohol compounds such as mono-, di-, tri-, or tetra-, propylene glycol, 1,3-propanediol, glycerin, 1,4-butanediol, 1,3-butanediol, 1,5-pentanediol, 1,6-hexanediol, and sorbitol; epoxy compounds such as ethylene glycol diglycidyl ether, and glycidol; polyvalent amine compounds or their condensation products with haloepoxy compounds, oxazoline compounds; (mono-, di-, or poly-) oxazolidinone compounds; alkylene carbonate compounds such as ethylene carbonate; oxetane compounds; cyclic urea compounds such as 2-imidazolidinone; and the like. Among them, dehydrating esterification reactive surface cross-linking agents being made up of polyhydric alcohol compounds, alkylene carbonate compounds, and oxazolidinone compounds, which require a high temperature reaction, are particularly preferable. The organic surface cross-linking agent may be used either singly or in combination of two or more types. Further, use of plural polyhydric alcohol compound, or combined use of polyhydric alcohols and other dehydration reactive surface cross-linking agent is preferable. With combined use at weight ratio of 1:9 to 9:1, and further 2:8 to 8:2, the water absorbent resin with even better physical properties is obtained.

Meanwhile, the surface cross-linking agents described in PCT/JP2012/052043 or PCT/JP2012/052044 (filed on Jan. 30, 2012) are also desirably used in the present invention.

In addition to the organic surface cross-linking agent (covalent bonding surface cross-linking agent), ionic bonding surface cross-linking agent such as polyvalent metal salt and polyamine polymers described in the PCT file may be used to improve liquid permeability or the like. Examples of the polyvalent metal salt which may be used include divalent or higher, preferably, trivalent to tetravalent polyvalent metal salts (organic salts or inorganic salts) or hydroxides. Examples of the polyvalent metals include aluminum, zirconium and the like, and examples of the salt of the polyvalent metals include aluminum lactate, aluminum sulfate and the like. Meanwhile, surface cross-linking using polyvalent metal is disclosed in WO 2007/121037 A, WO 2008/09843 A, and WO 2008/09842 A, U.S. Pat. No. 7,157,141, U.S. Pat. No. 6,605,673, and U.S. Pat. No. 6,620,889, US 2005/0288182 A, US 2005/0070671 A, US 2007/0106013 A, and US 2006/0073969 A etc.

Examples of the polyamine polymer which may be used include a polyamine polymer having weight average molecular weight of 5,000 to 1,000,000. Meanwhile, surface cross-linking using a polyamine polymer is disclosed in WO 2006/082188 A, WO 2006/082189 A, WO 2006/082197 A, WO 2006/111402 A, WO 2006/111403 A, and WO 2006/111404 A, and U.S. Pat. No. 7,098,284 etc.

In the present invention, for improving liquid permeability of the water absorbent resin to be obtained, an ionic bonding surface cross-linking agent such as polyvalent metal salt or polyamine polymer may be used in addition to the organic surface cross-linking agent, or an inorganic surface cross-linking agent may be used in addition to the organic surface cross-linking agent. When various kinds of surface cross-linking agents are used in combination, they may be added simultaneously (one time) or separately (several times) to the water absorbent resin. Meanwhile, regarding the used amount and addition method for the surface cross-linking agent, a solvent used with the surface cross-linking agent and the like, descriptions included in Patent Literatures 22 to 25 relating to the surface cross-linking agent are suitably applied.

(Used Amount and Heating Temperature)

In the present invention, used amount of the surface cross-linking agent is, although not specifically limited, preferably 0.001 to 10 parts by weight and more preferably 0.01 to 5 parts by weight relative to 100 parts by weight of the water absorbent resin powder. Meanwhile, when two or more types of the surface cross-linking agent are used, the used amount of the surface cross-linking agent means their total amount. When the covalent bonding surface cross-linking agent is used in combination with an ionic bonding surface cross-linking agent, each is used in combination in an amount of preferably 0.001 to 10 parts by weight and more preferably 0.01 to 5 parts by weight relative to 100 parts by weight of the water absorbent resin powder. The surface cross-linking agent is preferably used with water. Used amount of water is preferably 0.5 to 20 parts by weight and more preferably 0.5 to 10 parts by weight relative to 100 parts by weight of the water absorbent resin powder. Further, a hydrophilic organic solvent may be used, and the used amount thereof is preferably 0 to 10 parts by weight and more preferably 0 to 5 parts by weight relative to 100 parts by weight of the water absorbent resin powder.

When a solution of the surface cross-linking agent is added and mixed with the water absorbent resin powder of the present invention, the water absorbent resin powder swells due to water or the like present in a solution of the surface cross-linking agent. The swollen water absorbent resin powder is then dried by heating. The heating temperature is preferably 70 to 300° C., more preferably 80 to 220° C., still more preferably 150 to 210° C., and particularly preferably 170 to 200° C. The heating time is preferably 1 min to 120 min, and more preferably 10 min to 120 min.

Further, for the second method, and preferably for the first method, the water soluble component may be increased by performing again heating, particularly after the drying step (that is, the second heating treatment after drying step). It is also preferable to suppress the decrease amount of the water absorption capacity (CRC) to 1 to 10 [g/g], further to 2 to 8 [g/g] during the surface cross-linking step.

(2-7) Fine Powder Recycling Step

To improve physical properties of the water absorbent resin, the present method may comprise a fine powder removing step, more preferably a fine powder recycling step which comprises recycling a fine powder removed by the classification step to a step in or prior to the drying step. According to removal of fine powder, liquid permeability (for example, SFC) or water absorption capacity under load (for example, AAP) is improved, and by recycling fine powder, yield or water absorbent speed (for example, FSR) is also improved.

Further, by adding fine powder, in particular dried fine powder to particulate hydrogel, especially to the particulate hydrogel, the fine powder (indicating in particular dried fine powder, and also dried fine powder recycled to hydrogel) functions as a spacer for the particulate hydrogel and a releasing property of hydrogel or a property of supplying a suitable amount is improved, and therefore desirable. Thus, to achieve an object of the present invention, it is preferable that fine powder is included in the particulate hydrogel which is supplied to the traverse conveyor. More preferably, fine powder is included in the particulate hydrogel which is supplied to the dryer with an aid of the traverse conveyor.

Specifically, the present step is a step for recycling the fine powder (for example, fine powder containing fine particles with particle diameter of less than 150 µm as main content, particularly in an amount of 70% by weight or higher) removed by the classification step or the like, or hydrates thereof (collectively referred to as "recycled fine powder") to the step for producing the water absorbent resin. Thus, the present step is to recycle the collected fine powder to a step before the classification step, in particular to a step before the drying step, and the collected fine powder is preferably recycled to any one step of (2-1) polymerization step, (2-3) gel-crushing step, and (2-4) drying step. For example, as described in Examples 7 and 8, the pass-through after sieving with JIS standard sieve with mesh size of 150 µm during the classification step may be used. Meanwhile, recycling to the polymerization step is performed for the aqueous monomer solution or hydrogel (in particular, particulate hydrogel which has been gel-crushed by kneader polymerization or the like), and it is particularly preferable as the releasing property of hydrogel or property of supplying a suitable amount is improved.

The recycling amount of the fine powder in the present step is suitably determined depending on desired physical properties or particle size. It is preferably 0.1 to 50% by weight, more preferably 1 to 40% by weight, still more preferably 5 to 30% by weight, and particularly preferably 10 to 25% by weight of the whole dried product. Further, preferably 50 to 100% by weight, more preferably 70 to 100% by weight, and still more preferably 90 to 100% by weight of the collected fine powder is obtained from the classification step before surface cross-linking, and if necessary, fine powder from the classification step after the surface cross-linking step or a dust-collector (bug filter, in particular) is also collected.

In the present invention, although the present step is performed for recycling fine powder (fine powder or its hydrates), if necessary, it may be recycled after mixing with water, acrylic acid, an aqueous monomer solution, a polymerization initiator, a coloration preventing agent, inorganic fine particles and the like. For such case, for example, water is suitably determined in the range of 0 to 300 parts by weight and other additives are used in the range of 0 to 10 parts by weight relative to 100 parts by weight of the recycled fine powder.

By recycling fine powder, a water absorbent resin with more excellent performance (for example, high AAP, high liquid permeability, high water absorbent speed, narrow particle size distribution, an anti-caking property, and the like) can be obtained. Preferably, by recycling (adding) the fine powder during a step before the gel transporting step, in particular during the polymerization step and/or gel-crushing step, gel transport can be achieved more stably. Further, preferred modes for recycling fine powder are described in U.S. Pat. No. 6,133,193, U.S. Pat. No. 6,288,930, U.S. Pat. No. 5,455,284, U.S. Pat. No. 5,342,899, U.S. Pat. No. 7,786,211, and U.S. Pat. No. 8,080,620, US 2008/0306209 A, US 2010/0273942 A, US 2011/0001087 A, and US 2011/0118430 A, and EP 0785224 B etc., and they are suitably applied to the present invention.

(2-8) Other Steps

For the production method of the present invention, a step for recovering monomers vaporized during the polymerization, a step for granulation, a step for removing fine powder and the like, if necessary, may be included in addition to the steps described above. Further, for improving color stability with the lapse of time, preventing gel deterioration or the like, the additives may be added to the monomers or hydrogel.

Further, within the range in which the effect of the present invention is not negatively affected, water insoluble fine particle powder or surfactant may be co-present. Type and used amount of the water insoluble fine particle powder or surfactant to be used is specifically limited, and descriptions included in WO 2005/075070 A may be applied.

[3] Physical Properties of Polyacrylic Acid (Salt)-Based Water Absorbent Resin

The production method of the present invention is, particularly preferably applied to a case in which three or more physical properties of the water absorbent resin are to be controlled. Effect of controlling each physical property is preferably exhibited in the method for producing a water absorbent resin with multi-functions such as 4 or more, 5 or more, or 6 or more functions and excellent physical properties. Examples of the physical properties to be controlled include (a) water absorption capacity under load (AAP), (b) liquid permeability (SFC), (c) water absorption capacity without load (CRC), (d) water soluble component (Ext), (e) residual monomer, (f) initial coloration, (g) moisture content described below, and also free swell capacity (FSC), particle diameter, pH, flow rate, bulk specific gravity, respirable dust, dust, and the like, and application is preferably made to the production method for controlling them at high level. Although the physical properties to be controlled and the measurement method are suitably determined, the EDANA measurement method or the like may be applied to measurement of physical properties of the water absorbent resin.

Furthermore, in the case where a water absorbent resin obtained in the present invention is used as a raw material for sanitary materials, particularly disposable diapers, it is preferable that at least one of the following (a) to (g), further 2 or more including AAP, and particularly three or more physical properties are preferably controlled to desired range. When the followings are not satisfied, the effect of the present invention is not obtained at sufficient level, and thus sufficient performance may not be exhibited by a high concentration diaper described below.

(a) Water Absorption Capacity Under Load (AAP)

To prevent leakage from a paper diaper, the water absorbent resin obtained by production method of the present invention is controlled such that the water absorption capacity (AAP) against 0.9% by weight aqueous sodium chloride solution under load of 2.06 kPa (0.3 psi) is preferably 20 [g/g] or higher, more preferably 22 [g/g] or higher, and still more preferably 23 [g/g] or higher. The upper limit of the water absorption capacity under load (AAP) is not particularly limited, and higher value is more preferable. However, from the viewpoint of balance with other physical properties or cost, it is preferably 40 [g/g] or less. Similarly, the water absorption capacity (AAP) against 0.9% by weight aqueous sodium chloride solution under load of 4.83 kPa (0.7 psi) is controlled such that it is preferably 20 [g/g] or higher, more preferably 22 [g/g] or higher, and still more preferably 23 [g/g] or higher (upper limit is 30 [g/g] or lower). As described herein, note that AAP is a value obtained by the measuring method described in ERT 442.2-02 while the load condition is varied from 2.06 kPa to 4.83 kPa, unless specifically described otherwise.

(b) Liquid Permeability (SFC)

To prevent leakage from a paper diaper, the water absorbent resin obtained by production method of the present invention is controlled such that the 0.69% Saline Flow Conductivity (SFC), which represents liquid permeability under load, is preferably 1 $[\times 10^{-7} \cdot cm^3 \cdot s \cdot g^{-1}]$ or higher, more preferably 10 $[\times 10^{-7} \cdot cm^3 \cdot s \cdot g^{-1}]$ or higher, still more preferably 50 $[\times 10^{-7} \cdot cm^3 \cdot s \cdot g^{-1}]$ or higher, and particularly preferably 100 $[\times 10^{-7} \cdot cm^3 \cdot s \cdot g^{-1}]$ or higher. Further, it is preferably 1000 $[\times 10^{-7} \cdot cm^3 \cdot s \cdot g^{-1}]$ or lower and more preferably 500 $[\times 10^{-7} \cdot cm^3 \cdot s \cdot g^{-1}]$ or lower. The SFC is suitably controlled by surface cross-linking after the particle size control.

(c) Water Absorption Capacity without Load (CRC)

The water absorbent resin obtained by production method of the present invention is controlled such that the water absorption capacity without load (CRC) is preferably 10 [g/g] or higher, more preferably 20 [g/g] or higher, still more preferably 25 [g/g] or higher, and particularly preferably 27 [g/g] or higher. Higher CRC is more preferable and the upper limit is, although not specifically limited, preferably 50 [g/g] or lower, more preferably 45 [g/g] or lower, and still more preferably 40 [g/g] or lower from the viewpoint of balance with physical properties. Although the CRC may be suitably controlled with the type and amount of the cross-linking agent during polymerization, as described above, CRC is controlled to the above range by increasing the water soluble component after the drying step.

(d) Water Soluble Component (Ext)

The water absorbent resin obtained by production method of the present invention has water soluble component (Ext) of preferably 35% by weight or less, more preferably 25% by weight or less, still more preferably 15% by weight or less, and particularly preferably 10% by weight or less. The lower water soluble component is more preferable but it is generally 1% or more by weight from the viewpoint of productivity or the like. The water soluble component (Ext) can be suitably controlled based on the type and amount of the cross-linking agent during polymerization. However, in the present invention, it is preferable that the water soluble component is increased after the drying step such that CRC is controlled to the above range.

(e) Residual Monomers

In the water absorbent resin obtained by production method of the present invention, the amount of residual monomers (that is, remaining monomers) is preferably 0 to 700 ppm, more preferably 0 to 600 ppm, and particularly preferably 0 to 500 ppm.

(f) Initial Color Hue

The water absorbent resin obtained by the production method of the present invention has excellent initial color hue, and according to Hunter Lab surface colorimeter (the measurement method described in WO 2008/096713 A is also applied in the present invention), L value (lightness) is preferably 85 or higher, more preferably 87 or higher, and still more preferably 89 or higher, b value is preferably −5 to 10, more preferably −5 to 5, and still more preferably −4 to 4, and a value is preferably −2 to 2, more preferably −1 to 1, still more preferably −0.5 to 1, and most preferably 0 to 1. YI (yellowness degree) is preferably 10 or less, more preferably 8 or less, and particularly preferably 6 or less, and WB (white balance) is preferably 70 or higher, still more preferably 75 or higher, and particularly preferably 77 or higher. The water absorbent resin having such properties shows excellent color hue with the lapse of time and exhibits sufficient whiteness even under high temperature and high humidity, which is an accelerated test (model) for long-term storage. The initial color hue may be determined by contact time with the polymerization inhibitor or air, or by drying temperature.

(g) Moisture Content

The moisture content of the water absorbent resin obtained by the production method of the present invention is preferably adjusted to 0.1 to 10% by weight, and more preferably to 1 to 5% by weight, from the viewpoint of water absorbent speed or impact resistance.

[4] Use of Polyacrylic Acid (Salt)-Based Water Absorbent Resin

Use of the water absorbent resin obtained by the production method of the present invention is not particularly limited and the water absorbent resin may be used for absorbent articles including hygiene products such as paper diapers, sanitary napkins, and pads for incontinent, water retention agents for agriculture and horticulture, solidifying agents for waste liquids, and industrial water shielding materials and the like.

The water absorbent resin obtained in the present invention exhibits particularly excellent performance when it is used as an absorbent article using the water absorbent resin in a high concentration. That is, the content (core concentration) of the water absorbent resin in an absorbent body in the absorbent article is preferably 30 to 100% by weight, more preferably 40 to 100% by weight, still more preferably 50 to 100% by weight, further still more preferably 60 to 100% by weight, particularly preferably 70 to 100% by weight, and most preferably 75 to 95% by weight. The effect of the present invention can be exhibited more by controlling the core concentration in the above-mentioned range, which is preferable. In the case where the water absorbent resin obtained by the present invention is, particularly, used for an upper layer part of an absorbent body in the above-mentioned core concentration range, owing to the high liquid permeability (liquid permeability under load), the water absorbent resin is excellent in the dispersability of an absorbed liquid such as urine and the like and the absorption amount in the entire absorbent article such as a disposable diaper and the like is improved owing to the efficient liquid distribution and therefore preferable. Further, the water absorbent resin is preferable since it can provide an absorbent article which keeps a white color state giving clean impression.

EXAMPLES

The present invention will be described below by referring to Examples. However, the present invention is not limited to these Examples. In addition, unless specifically described otherwise, each step of Examples is performed under substantially normal pressure (that is, within ±5%, and still more preferably 1% or less of atmospheric pressure), and no pressure change such as intentional pressurizing or de-pressurizing is made during the single step. Unless specifically described otherwise, the measurement of physical properties or the like was made under atmospheric pressure, a room temperature (20 to 25° C.), and relative humidity of 40 to 50% RH.

[Resin Solid Content (Solid Content)]

A water absorbent resin in an amount of about 1 g (weight W2 [g]) was weighed in an aluminum cup with a bottom surface diameter of about 5 cm (weight W1 [g]) and it was stood still in a dryer at 180° C. with no wind for 3 hours. Thereafter, the total weight (W3 [g]) of the aluminum cup and the water absorbent resin powder was measured and the moisture content (% by weight) was calculated according to the following equation.

$$\text{Moisture content[\% by weight]}=100-\{(W3-W1)/W2\times100\} \quad \text{[Mathematical formula 1]}$$

Meanwhile, for measuring the resin solid content in the particulate hydrogel polymer, the sampling amount of the particulate hydrogel polymer was changed to 2 to 4 g and the drying time was changed to 24 hours.

[Weight Average Particle Diameter (D50) of Particulate Hydrogel]

In the present invention, the weight average particle diameter (D50) of particulate hydrogel was measured with reference to the method described in paragraphs [0091] to of JP 2000-63527 A.

In other words, to 1000 g of a 20% by weight aqueous sodium chloride solution, 30 g of the water absorbent resin (resin solid content: a % by weight) was added and stirred with a stirrer chip (length: 5 cm, outer diameter: 8 mm) at 300 rpm for 120 minutes for swelling. After finishing the stirring, the water absorbent resin after swelling was added on a sieve with mesh size of 9.5 mm, 2.0 mm, 0.85 mm, 0.6 mm, 0.3 mm, or 0.07 mm followed by adding 6000 g of 20% by weight aqueous sodium chloride solution for the classification. After finishing the classification, moisture was fully removed and the weight of the water absorbent resin on each sieve was measured.

When the weight of the water absorbent resin after classification and removing water is W and mesh size of the sieve is r, the particle size distribution of the particulate hydrogel was plotted on a logarithmic probability paper based on the following formula.

$$R(\alpha)[\text{nm}]=(20/w)^{1/3}\times r \quad \text{[mathematical formula 2]}$$

The particle diameter corresponding to R=50% of the above mathematical formula is taken as the weight average particle diameter (D50).

[Neutralization Rate]

In a 250 ml volume beaker, 200 g of a 0.9% aqueous sodium chloride solution (physiological saline) was weighed and 1.00 g of the water absorbent resin was added to the aqueous solution. Thereafter, by stirring for 16 hours after covering, soluble components in the resin were extracted. The extract was filtered using a filter paper and about 50.0 g of the thus-obtained filtrate was weighed and used for solution for measurement.

First, only the physiological saline was neutralized to pH 10 using 0.1 N aqueous NaOH solution followed by neutralization to pH 2.7 using 0.1 N aqueous HCl solution to obtain blank neutralization amount ($Wb_{NaOH}$ [ml], $Wb_{HCl}$ [ml]). The same neutralization process was repeated for the test solution to obtain the neutralization amount ($W_{NaOH}$ [ml], $W_{HCl}$ [ml]). The neutralization rate was obtained according to the following formula.

Neutralization rate[% by mol]={1−($W_{NaOH}$−$Wb_{NaOH}$)/($W_{HCl}$−$Wb_{HCl}$)}×100  [mathematical formula 3]

Meanwhile, for measuring the neutralization rate of the particulate hydrogel polymer, the sample amount of the particulate hydrogel polymer was changed to 2 to 4 g.

[Water Soluble Component (Ext) and Gel Water Soluble Component (Gel Ext)]

In the present invention, the water soluble component (Ext) in the water absorbent resin and gel water soluble component (gel Ext) of the particulate hydrogel were measured in accordance with ERT 470.2-02.

That is, for measurement of the water soluble component (Ext) in the water absorbent resin, 1.0 g of the water absorbent resin and 200 ml of a 0.90% by weight aqueous sodium chloride solution were added to a plastic container (capacity: 250 mL) having a lid, and stirred with a cylindrical stirrer (length: 3.5 cm, diameter: 6 mm) at 400 rpm for 16 hours, and the water soluble components were extracted from the water absorbent resin. The extract was filtered with a single filter paper (produced by Advantec ToyoKaisha, Ltd., product name: JIS P 3801, No. 2, thickness: 0.26 mm, retaining particle diameter: 5 μm), and 50.0 g of the obtained filtrate was used as a measurement liquid.

Subsequently, the measurement liquid was titrated with a 0.1 N NaOH aqueous solution until the measurement liquid reached a pH of 10, further titrated with a 0.1 N HCl aqueous solution until the measurement liquid reached a pH of 2.7, and then determined titers ([NaOH] ml and [HCl] ml) at that stage. The same procedure was also performed for only a 0.90% by weight aqueous sodium chloride solution to determine blank titers ([bNaOH] ml and [bHCl] ml).

On the basis of the titration amount and average molecular weight of the raw material monomer of the water absorbent resin that has been obtained from above procedures, the water soluble component (Ext) in the water absorbent resin was calculated according to the formula described below.

Ext[% by weight]=0.1×$Mw$×200×100×([HCl]−[bHCl])/1000/(Weight of water absorbent resin [g])/50.0  [mathematical formula 4]

To calculate the gel water soluble component (gel Ext) of the particulate hydrogel, 5.0 g of the particulate hydrogel was used as a sample and the time for stirring (extraction) was changed to 24 hours. Other than those, the same operations as those for the water soluble component (Ext) in the water absorbent resin described above were performed. Further the weight of the water absorbent resin in the particulate hydrogel was measured from the resin solid content of the particulate hydrogel, and the gel water soluble component (gel Ext) was calculated according to the formula described below.

Gel Ext[% by weight]={($V_{HCl.s}$−$V_{HCl.b}$)×$C_{HCl}$×Mw×$F_{dil}$×100}/{ms×($Wn$/100)×1000}  [mathematical formula 5]

In the above formula, $V_{HCl.s}$ represents the amount [ml] of HCl necessary to reduce the pH from 10 to 2.7 of a filtrate including a dissolved polymer;

$V_{HCl.b}$ represents the amount [ml] of HCl necessary to reduce the pH from 10 to 2.7 of Blank (0.9% by weight aqueous sodium chloride solution);

$C_{HCl}$ represents the concentration [mol/l] of an HCl solution;

Mw represents the average molecular weight [g/mol] of a monomer unit in acrylic acid (salt) polymer (for example, Mw is 88.1 [g/mol] in the case of a neutralization rate of 73% by mol);

$F_{dil}$ represents the dilution level of a filtrate including a dissolved polymer;

ms represents the weight [g] of a particulate hydrogel before the measurement; and Wn represents the resin solid content [% by weight] of the particulate hydrogel.

[CRC and Gel CRC]

In the present invention, CRC of the water absorbent resin and gel CRC of the particulate hydrogel were measured in accordance with ERT 441.2-02.

That is, for measurement of CRC of the water absorbent resin, 0.20 g of the water absorbent resin was weighed and placed in a bag (60×60 mm) made of unwoven cloth evenly. Then, the bag was heat-sealed and the bag was immersed in 1000 ml of a 0.9% by weight aqueous sodium chloride solution having a temperature adjusted to 25±3° C. 30 minutes later, the bag was taken out, the moisture was removed by using a centrifugal device (centrifugal device produced by KOKUSAN Corporation, model: H-122) under the conditions of 250 G and 3 minutes, and then the weight W4 [g] of the bag was measured. The same operation was repeated without adding any water absorbent resin, and the weight W5 [g] of a corresponding bag was measured. Thereafter, CRC of the water absorbent resin was calculated according to the following formula.

CRC[g/g]{(W4−W5)/(weight of water absorbent resin [g])}−1  [mathematical formula 6]

To measure gel CRC of the hydrogel, the same operation as above was repeated except for use of 0.4 g of hydrogel and a free swelling time of 24 hours. The resin solid content of the hydrogel was separately measured, and the weight of the water absorbent resin in the above 0.4 g of hydrogel was obtained. After that, gel CRC was calculated according to the formula given below. The measurement was made 5 times for each sample, and the average value was taken.

gel CRC[g/g]={(mwi−mb)−msi×(Wn/100)}/{msi×(Wn/100)}  [mathematical formula 7]

In the above formula, msi; the weight [g] of a hydrogel before measurement;

mb; the weight [g] of Blank (unwoven cloth bag only) after free swell and draining;

mwi; the weight [g] of the hydrogel after free swell and draining; and

Wn; the resin solid content [% by weight] of the hydrogel.

[SFC (Saline Flow Conductivity)]

The SFC (saline flow conductivity) of the water absorbent resin obtained by the present invention was measured according to the descriptions of U.S. Pat. No. 5,669,894.

[Other Physical Properties]

Physical properties such as particle size distribution water absorbent resin, amount of residual monomers or the like were measured according to ERT of EDANA as described above or US 2006/204,755 A.

Production Example 1

An aqueous monomer solution (a) containing acrylic acid (containing 70 ppm p-methoxy phenol (relative to acrylic acid) as a polymerization inhibitor), 48.5% by weight aqueous solution of sodium hydroxide (containing 0.7 ppm (in detail, 1 ppm in terms of $Fe_2O_3$ (relative to acrylic acid)) iron as impurities), ion exchange water, polyethylene glycol diacrylate (the number of ethylene oxide unit; 9 on average) as an internal cross-linking agent, and trisodium diethylenetriamine pentaacetic acid as a chelating agent was prepared. The aqueous monomer solution (a) has monomer concentration of 40% by weight and neutralization rate of 75% by mol. It also contains 0.3 ppm (relative to monomer) iron (in terms of $Fe_2O_3$) as impurities and 57 ppm (relative to monomer) polymerization inhibitor. Further, the used amount of the internal cross-linking agent was 0.09% by mol (relative to monomer) and the used amount of the chelating agent was 100 ppm (relative to monomer).

Subsequently, liquid temperature of the aqueous monomer solution (a) was increased to 90° C., and while adding and mixing 0.05% by mol (relative to monomer) of sodium persulfate as a polymerization initiator, it was continuously supplied to a continuous belt type polymerization apparatus. Within about 30 seconds after the supply, the polymerization started to form a sheet-like hydrogel (a).

Within one minute after discharged from the polymerization apparatus, the hydrogel (a) was added to a meat chopper (in detail, a screw type extruder having a porous plate) for gel-crushing. Meanwhile, temperature of the sheet-like hydrogel added to the meat chopper was 80° C. (measured at infrared temperature). Moisture content in the obtained particulate hydrogel (a) was 49.3% by weight, neutralization rate was 75.3% by mol, gel CRC was 27.5 [g/g], water soluble component (gel Ext) was 3.4% by weight, powder temperature (temperature of the particulate hydrogel (a) before being subjected to the drying step) was 85° C., weight average particle diameter (D50) was 1.5 mm, and coarse particles having particle size of 5 mm or larger constituted 0.3% by weight of the total.

Comparative Example 1

Within 5 minutes after gel-crushing, the particulate hydrogel (a) obtained from the above Production Example 1 was continuously supplied to a belt of the traverse conveyor (hereinafter, referred to as "conveyor belt") illustrated in FIG. 1 at a rate of 4.5 [t/hr], and then supplied to a through-flow belt of the continuous through-flow belt-type dryer such that the gel layer had width of 1.8 m. As a result, the comparative dried polymer (1) was obtained. Meanwhile, the traverse conveyor was installed 2 m below the outlet of the meat chopper and the continuous through-flow belt-type dryer was installed 0.5 m below the traverse conveyor.

The conveyor belt has length of 3 m in advancing direction and width of 0.8 m, while both ends of the belt are hold by a roll with radius of 10 cm. The surface material of the belt is SUS304 substrate coated with a silicone resin sheet (contact angle with respect to water: 95°, heat resistant temperature: 200° C. or higher). Further, the conveyor belt has a downward tilt of 1°, that is, the surface receiving the particulate hydrogel is tilted by 1° against the horizontal direction.

The traverse conveyor having the conveyor belt was operated according to the following conditions. Meanwhile, the surface temperature of the conveyor belt was measured in the vicinity of the position that the particulate hydrogel discharged from the meat chopper was supplied on the conveyor belt (refer to "7" of FIG. 1 and FIG. 2).

Conveyor belt speed; 0.2 [m/s]
Height of gel layer of the particulate hydrogel on conveyor belt; 5 cm
Size of portion retaining the particulate hydrogel; 2.2×0.3 m
Surface temperature of conveyor belt (in case of continuous operation); 33° C. (atmospheric temperature; 25° C.)
Traverse angle of conveyor belt; −20 to +20° (0° in advancing direction)
Traverse period of conveyor belt (that is, time for one reciprocating motion); 10 seconds Meanwhile, time required for transporting (dropping) the particulate hydrogel (a) from the meat chopper to the traverse conveyor and time required for transporting (dropping) from the traverse conveyor onto the belt of the continuous through-flow belt-type dryer are negligible and thus the retention time on the traverse conveyor is calculated as 11 seconds based on the length of the portion in which the particulate hydrogel (a) is retained as 2.2 m, and the conveyor belt speed of 0.2 [m/s]. That is, the air contact time from the gel-crushing step to supply to the drying step was 11 seconds.

Next, inside of the continuous through-flow belt-type dryer was divided into seven chambers, that is, the first chamber, the second chamber, and so on starting from the upstream side. The last one was the seventh chamber. The drying condition for the continuous through-flow belt-type dryer (wind direction, linear speed of hot air or the like) was designed to be controlled in each chamber. In Comparative Example 1, hot air at 180° C. (dew point: 72° C.) was set to blow in upward direction at 1.5 [m/s] for the first and the second chambers while it was set in downward direction at 1.2 [m/s] for the third to sixth chambers to dry the particulate hydrogel (a). Further, hot air at 60° C. was set to blow in downward direction at 1.5 [m/s] for the seventh chamber to forcibly cool the comparative dried polymer (1). Meanwhile, retention time in each chamber was 5 minutes, and the total retention time in the first to sixth chambers (30 minutes) corresponds to the drying time. Meanwhile, during the drying step, the belt of the continuous through-flow belt-type dryer was moved at the speed of 0.02 [m/s] for all the chambers from the first to sixth chambers. In addition, the gel thickness on the dryer belt was 7.1 cm.

The comparative dried polymer (1) obtained by the above drying was continuously de-aggregated at the exit of the dryer, continuously pulverized using a roll mill, and then continuously classified using a JIS standard sieve with mesh size of 850 µm or 150 µm. As a result, the comparative water absorbent resin powder (1) was obtained.

Subsequently, relative to 100 parts by weight of the comparative water absorbent resin powder (1), an aqueous solution of the surface cross-linking agent containing 0.3 parts by weight of 1,4-butane diol, 0.6 parts by weight of propylene glycol, 2.5 parts by weight of ion exchange water, and 1 part by weight of 27.5% by weight aqueous solution of aluminum sulfate was added, and a heating treatment was conducted for 40 minutes at 200° C. by using a paddle type dryer. After that, further classification was performed using a JIS standard sieve with mesh size of 85011 m. The remained on the sieve were re-pulverized and admixed with the pass-through to give the comparative water absorbent resin (1). Physical properties of the obtained comparative water absorbent resin powder (1) and physical properties of the comparative water absorbent resin (1) are illustrated in Tables 1 and 2, respectively.

Meanwhile, when the particulate hydrogel (a) was supplied to the continuous through-flow belt-type dryer by using the traverse conveyor, poor releasing of the particulate hydrogel (a) occurred at the end of the conveyor belt, yielding unstable drop position on the belt of the continuous through-flow belt-type dryer. For such reasons, heterogeneity in gel layer height of the particulate hydrogel (a) was observed in the advancing direction of the dryer belt. Further, as a result of performing continuously the above operation for one week, the particulate hydrogel (a) was adhered on the conveyor belt and discoloration to brown color was observed.

Example 1

With regard to Comparative Example 1, except that a cover is installed to create a closed space at upstream side of the traverse conveyor and the continuous through-flow belt-type dryer and the heat discharged from the dryer is remained inside the cover, the same operation as Comparative Example 1 was performed to give the water absorbent resin powder (1) and the water absorbent resin (1). Physical properties of the water absorbent resin powder (1) are illustrated in Table 1 and the physical properties of the water absorbent resin (1) are illustrated in Table 2.

In Example 1, temperature inside the cover (atmospheric temperature) was 42° C., surface temperature of the conveyor belt was 56° C., and the air contact time from the gel-crushing step to supply to the drying step was 11 seconds. At that time, poor releasing of the particulate hydrogel did not occur at the end of the conveyor belt and the gel layer height of the particulate hydrogel was homogeneous in the advancing direction of the dryer belt. Further, even after the above operation was continued for one week, adhesion of the particulate hydrogel to the conveyor belt was not observed. Further, by installing a covering (cover) over the traverse conveyor, impurities were not incorporated and malodor was not released to the outside, yielding better working environment.

Example 2

With regard to Comparative Example 1, except that the surface temperature of the conveyor belt is heated to 80° C. by using a heater from the back side of the conveyor belt, the same operation as Comparative Example 1 was performed to give the water absorbent resin powder (2) and the water absorbent resin (2). Physical properties of the water absorbent resin powder (2) are illustrated in Table 1 and the physical properties of the water absorbent resin (2) are illustrated in Table 2.

In Example 2, the air contact time from the gel-crushing step to supply to the drying step was 11 seconds. At that time, poor releasing of the particulate hydrogel did not occur at the end of the conveyor belt and the gel layer height of the particulate hydrogel was homogeneous in the advancing direction of the dryer belt. Further, even after the above operation was continued for one week, adhesion of the particulate hydrogel to the conveyor belt was not observed.

Example 3

With regard to Example 1, except that the conveyor belt speed is set to 7 [m/s], the same operation as Example 1 was performed to give the water absorbent resin powder (3) and the water absorbent resin (3). Physical properties of the water absorbent resin powder (3) are illustrated in Table 1 and the physical properties of the water absorbent resin (3) are illustrated in Table 2.

In Example 3, the air contact time from the gel-crushing step to supply to the drying step was 1 second. At that time, poor releasing of the particulate hydrogel did not occur at the end of the conveyor belt and the gel layer height of the particulate hydrogel was homogeneous in the advancing direction of the dryer belt. Further, even after the above operation was continued for one week, adhesion of the particulate hydrogel to the conveyor belt was not observed.

Comparative Example 2

With regard to Comparative Example 1, except that the surface material of the conveyor belt is made of a fluoro resin (contact angle with respect to water; 105°), the same operation as Comparative Example 1 was performed to give the comparative water absorbent resin powder (2) and the comparative water absorbent resin (2). Physical properties of the comparative water absorbent resin powder (2) are illustrated in Table 1 and the physical properties of the comparative water absorbent resin (2) are illustrated in Table 2.

In Comparative Example 2, poor releasing of the particulate hydrogel hardly occurred at the end of the conveyor belt. But there was slight aggregation among the particulate hydrogel on the conveyor belt, and it was dropped as a huge aggregate on the dryer belt. Further, even after the above operation was continued for one week, adhesion of the particulate hydrogel to the conveyor belt was not observed.

Example 4

With regard to Example 1, except that the surface material of the conveyor belt is made of a fluoro resin (contact angle with respect to water; 105°, heat resistant temperature; 200° C. or higher), the same operation as Example 1 was performed to give the water absorbent resin powder (4) and the water absorbent resin (4). Physical properties of the water absorbent resin powder (4) are illustrated in Table 1 and the physical properties of the water absorbent resin (4) are illustrated in Table 2.

In Example 4, the air contact time from the gel-crushing step to supply to the drying step was 11 seconds. At that time, poor releasing of the particulate hydrogel did not occur at the end of the conveyor belt and the gel layer height of the particulate hydrogel was homogeneous in the advancing direction of the dryer belt. Further, even after the above operation was continued for one week, adhesion of the particulate hydrogel to the conveyor belt was not observed.

Comparative Example 3

With regard to Example 2, except that the surface temperature of the conveyor belt is adjusted to 130° C., the same operation as Example 2 was performed to give the comparative water absorbent resin powder (3) and the comparative water absorbent resin (3). Physical properties of the comparative water absorbent resin powder (3) are illustrated in Table 1 and the physical properties of the comparative water absorbent resin (3) are illustrated in Table 2.

In Comparative Example 3, the air contact time from the gel-crushing step to supply to the drying step was 11 seconds. However, poor releasing of the particulate hydrogel occurred at the end of the conveyor belt, yielding unstable drop position on the dryer belt. When the above operation was continued for one week, the particulate hydrogel was adhered on the conveyor belt. However, the adhered gel was not discolored.

Production Example 2

With regard to Production Example 1, except that the used amount of polyethylene glycol diacrylate is changed to 0.05% by mol (relative to monomer), the same operation as Production Example 1 was performed to give the particulate hydrogel (b). moisture content in the particulate hydrogel (b) was 49.4% by weight, neutralization rate was 75.2% by mol, gel CRC was 32.5 [g/g], water soluble component (gel Ext) was 6.4% by weight, powder temperature (i.e., temperature of the particulate hydrogel (b) before being subjected to the drying step) was 86° C., weight average particle diameter (D50) was 1.6 mm, and coarse particles having particle size of 5 mm or larger constitute 0.7% by weight of the total.

Example 5

With regard to Example 1, except that the particulate hydrogel (b) is used instead of the particulate hydrogel (a), the same operation as Example 1 was performed to give the water absorbent resin powder (5) and the water absorbent resin (5). Physical properties of the water absorbent resin powder (5) are illustrated in Table 1 and the physical properties of the water absorbent resin (5) are illustrated in Table 2.

In Example 5, the air contact time from the gel-crushing step to supply to the drying step was 11 seconds. At that time, poor releasing of the particulate hydrogel did not occur at the end of the conveyor belt and the gel layer height of the particulate hydrogel was homogeneous in the advancing direction of the dryer belt. Further, even after the above operation was continued for one week, adhesion of the particulate hydrogel to the conveyor belt was not observed.

Production Example 3

With regard to Production Example 1, except that the internal cross-linking agent is changed to N,N'-methylene bisacrylamide in a used amount of 0.026% by mol (relative to monomer), the same operation as Production Example 1 was performed to give the particulate hydrogel (c). moisture content in the particulate hydrogel (c) was 49.2% by weight, neutralization rate was 75.1% by mol, gel CRC was 38.5 [g/g], water soluble component (gel Ext) was 10.9% by weight, powder temperature (temperature of the particulate hydrogel (c) before being subjected to the drying step) was 88° C., weight average particle diameter (D50) was 1.7 mm, and coarse particles having particle size of 5 mm or larger constitute 2.1% by weight of the total.

Example 6

With regard to Example 1, except that the particulate hydrogel (c) is used instead of the particulate hydrogel (a), the same operation as Example 1 was performed to give the water absorbent resin powder (6) and the water absorbent resin (6). Physical properties of the water absorbent resin powder (6) are illustrated in Table 1 and the physical properties of the water absorbent resin (6) are illustrated in Table 2.

In Example 6, the air contact time from the gel-crushing step to supply to the drying step was 11 seconds. At that time, poor releasing of the particulate hydrogel slightly occurred at the end of the conveyor belt. Further, after the above operation was continued for one week, adhesion of the particulate hydrogel to the conveyor belt was observed and discoloration to brown color was shown.

Example 7

With regard to Example 5, except that fine powder generated during the classification step (the pass-through of a JIS standard sieve with mesh size of 150 μm) is continuously collected and then continuously added to a meat chopper (a screw type extruder having a porous plate) together with the hydrogel (b), the same operation as Example 5 was performed to give the water absorbent resin powder (7) and the water absorbent resin (7). Physical properties of the water absorbent resin powder (7) are illustrated in Table 1 and the physical properties of the water absorbent resin (7) are illustrated in Table 2.

Meanwhile, addition of the fine powder to the meat chopper was performed within three hours after recycling, and the amount of recycled fine powder and the addition amount of fine powder were controlled to have a balance. Further, the amount of recycled fine powder in balanced state was 11% by weight of the production amount.

In Example 7, poor releasing of the particulate hydrogel did not occur at the end of the conveyor belt and the gel layer height of the accumulated particulate hydrogel was homogeneous in the advancing direction of the dryer belt. Further, even after the above operation was continued for one week, adhesion of the particulate hydrogel to the conveyor belt was not observed.

Example 8

With regard to Example 6, except that fine powder generated during the classification step (the pass-through of a JIS standard sieve with mesh size of 150 μm) is continuously collected and then continuously added to a meat chopper (a screw type extruder having a porous plate) together with the hydrogel (c), the same operation as Example 6 was performed to give the water absorbent resin powder (8) and the water absorbent resin (8). Physical properties of the water absorbent resin powder (8) are illustrated in Table 1 and the physical properties of the water absorbent resin (8) are illustrated in Table 2.

Meanwhile, addition of the fine powder to the meat chopper was performed within three hours after recycling, and the amount of collected fine powder and the addition amount of fine powder were controlled to have a balance. Further, the amount of recycled fine powder in balanced state was 11% by weight of the production amount.

In Example 8, poor releasing of the particulate hydrogel did not occur at the end of the conveyor belt and the gel layer height of the accumulated particulate hydrogel was homogeneous in the advancing direction of the dryer belt. Further, even after the above operation was continued for one week, adhesion of the particulate hydrogel to the conveyor belt was not observed.

TABLE 1

Physical properties of water absorbent resin powder (water absorbent resin before surface cross-linking (after drying and pulverizing))

| | | Resin solid content [wt %] | CRC [g/g] | Water soluble component [wt %] | Residual monomer [ppm] |
|---|---|---|---|---|---|
| Comparative Example 1 | Comparative water absorbent resin powder (1) | 95.4 | 33.4 | 8.3 | 416 |
| Example 1 | Water absorbent resin powder (1) | 95.6 | 33.1 | 7.8 | 415 |
| Example 2 | Water absorbent resin powder (2) | 95.6 | 33.1 | 7.7 | 408 |
| Example 3 | Water absorbent resin powder (3) | 95.8 | 33.1 | 7.8 | 410 |

TABLE 1-continued

Physical properties of water absorbent resin powder (water absorbent resin before surface cross-linking (after drying and pulverizing))

|   |   | Resin solid content [wt %] | CRC [g/g] | Water soluble component [wt %] | Residual monomer [ppm] |
|---|---|---|---|---|---|
| Comparative Example 2 | Comparative water absorbent resin powder (2) | 95.3 | 33.3 | 8.2 | 412 |
| Example 4 | Water absorbent resin powder (4) | 95.5 | 33.1 | 7.7 | 407 |
| Comparative Example 3 | Comparative water absorbent resin powder (3) | 95.5 | 33.1 | 7.7 | 434 |
| Example 5 | Water absorbent resin powder (5) | 95.3 | 40.3 | 11.8 | 401 |
| Example 6 | Water absorbent resin powder (6) | 95.1 | 40.5 | 11.5 | 403 |
| Example 7 | Water absorbent resin powder (7) | 96.2 | 39.6 | 11.6 | 411 |
| Example 8 | Water absorbent resin powder (8) | 96.1 | 40.1 | 11.4 | 410 |

TABLE 2

Physical properties of water absorbent resin (water absorbent resin after surface cross-linking)

|   |   | CRC [g/g] | AAP [g/g] | SFC [$\times 10^{-7} \cdot cm^3 \cdot s \cdot g^{-1}$] |
|---|---|---|---|---|
| Comparative Example 1 | Comparative water absorbent resin (1) | 27.1 | 22.9 | 113 |
| Example 1 | Water absorbent resin (1) | 27.0 | 23.1 | 118 |
| Example 2 | Water absorbent resin (2) | 27.0 | 23.2 | 120 |
| Example 3 | Water absorbent resin (3) | 27.0 | 23.1 | 118 |
| Comparative Example 2 | Comparative water absorbent resin (2) | 27.1 | 22.9 | 114 |
| Example 4 | Water absorbent resin (4) | 27.0 | 23.1 | 119 |
| Comparative Example 3 | Comparative water absorbent resin (3) | 27.0 | 23.1 | 116 |
| Example 5 | Water absorbent resin (5) | 30.1 | 24.7 | 48 |
| Example 6 | Water absorbent resin (6) | 30.3 | 24.3 | 45 |
| Example 7 | Water absorbent resin (7) | 29.5 | 24.5 | 44 |
| Example 8 | Water absorbent resin (8) | 30.1 | 24.3 | 42 |

SUMMARY

From Examples 1 to 4 and Comparative Examples 1 to 3, it was found that controlling the surface temperature of the conveyor belt within 40° C. to 120° C. is important from the viewpoint of having stable operation and/or physical properties. Meanwhile, the moisture content was 1% by weight or so (that is, solid content of 99% by weight) for the water absorbent resin (1) to (8) and the comparative water absorbent resin (1) to (3) in Table 2. Further, the residual monomers are present in almost the same amount as the corresponding water absorbent resin powder (before surface cross-linking).

Further, it was illustrated in Tables 1 and 2 that CRC and water soluble component of the obtained water absorbent resin powder as well as the CRC of the water absorbent resin are almost the same in Examples 5 and 6. However, gel Ext of the particulate hydrogel is 6.4% by weight (Production Example 2) in Example 5 while it is 10.9% by weight (Production Example 3) in Example 6, showing a difference. As a result, a difference in adhesion property of the particulate hydrogel was also observed. Thus, it was found that controlling the gel Ext of the particulate hydrogel to 10% by weight or less and increasing the water soluble component (and also CRC) by drying treatment are preferable from the viewpoint of the adhesion property and physical properties of the particulate hydrogel.

It was also found that in Examples 7 and 8 recycling of fine powder can improve the yield, and by including fine powder in the particulate hydrogel, the adhesion property to the conveyor belt is improved.

INDUSTRIAL APPLICABILITY

Since a water absorbent resin having excellent physical properties can be produced without any trouble, the water absorbent resin of the present invention can be used for various hygienic materials such as paper diaper and sanitary napkin and also for other various applications.

The present application is based on Japanese Patent Application No. 2011-093829 which has been filed on Apr. 20, 2011, and the disclosure is incorporated herein by reference in its entirety.

EXPLANATION OF SYMBOLS

1 Gel grinder (meat chopper)
2 Pipe
3 Traverse conveyor
4 Continuous through-flow belt-type dryer
5 Dryer (drying chamber)
6 Cooling chamber
7 Location for temperature device on surface of traverse conveyor belt
8 Particulate water-containing gel-like cross-linked polymer (particulate hydrogel)
9 Dried polymer (water absorbent resin)

The invention claimed is:

1. A method for producing a polyacrylic acid (salt)-based water absorbent resin, the production process comprising:
   a polymerization step of polymerizing an aqueous monomer solution containing a polymerization inhibitor, acrylic acid (salt) and an internal cross-linking agent to produce a water-containing gel-like cross-linked polymer;
   a gel-crushing step of performing the gel-crushing of the water-containing gel-like cross-linked polymer simultaneously with or subsequent to the polymerization to produce a particulate water-containing gel-like cross-linked polymer;
   a gel transporting step of supplying the particulate water-containing gel-like cross-linked polymer to a continuous through-flow belt-type dryer by a traverse conveyor; and
   a drying step of drying the particulate water-containing gel-like cross-linked polymer by the continuous through-flow belt-type dryer,
   wherein the belt temperature of the traverse conveyor is 40 to 120 C.

2. The method according to claim 1, wherein a water soluble component in the particulate water-containing gel-like cross-linked polymer is 10% by weight or less and the water soluble component is increased after the drying step, and wherein the water soluble component is measured by adding 1.000 g of the particulate water-containing gel-like cross-linked polymer into 200 ml of 0.9% by weight aqueous sodium chloride solution, stirring for 16 hours at 500 rpm and measuring by pH titration, an amount of dissolved polymer (unit; by weight).

3. The method according to claim 2, wherein the internal cross-linking agent has a thermally degradable skeleton or a (poly)ethylene glycol skeleton.

4. The method according to claim 2, wherein the water soluble component is increased within the range of 1 to 10% by weight.

5. The method according to claim 2, wherein the particulate water-containing gel-like cross-linked polymer has a water absorption capacity without load (CRC) of less than 30 [g/g].

6. The method according to claim 1, wherein the main body of the traverse conveyor is connected to the dryer while the traverse conveyor being in a practically covered state.

7. The method according to claim 6, wherein the main body of the traverse conveyor is under atmosphere of 30 C or higher.

8. The method according to claim 1, wherein the particulate water-containing gel-like cross-linked polymer has a temperature of 50 C or higher.

9. The method according to claim 1, wherein the neutralization rate of acrylic acid in the aqueous monomer solution exceeds 60% by mol.

10. The method according to claim 1, further comprising a pulverizing step, a classification step, and a surface cross-linking step after the drying step, and further comprising a fine powder recycling step of recycling fine powder obtained from the classification step to a step in or prior to the drying step.

11. The method according to claim 1, wherein the difference between the belt temperature of the traverse conveyor and the temperature of the particulate water-containing gel-like cross-linked polymer is 0 to 30 C.

12. The method according to claim 1, wherein air contact time of the particulate water-containing gel-like cross-linked polymer obtained from the gel-crushing step till the supply to the continuous through-flow belt-type dryer is within 180 seconds.

13. The method according to claim 1, wherein the belt width of the traverse conveyor is 0.1 to 1 m and the area occupancy ratio of the particulate water-containing gel-like cross-linked polymer is 10 to 90% in the width direction of the belt.

14. The method according to claim 1, wherein the belt tilt angle of the traverse conveyor is less than −10 when the horizontal direction is assumed to be 0.

15. The method according to claim 1, wherein the belt surface roughness (Rz) of the traverse conveyor is 800 nm or less.

16. The method according to claim 1, wherein the belt surface material of the traverse conveyor has a contact angle with respect to water of 60 or more and a heat deflection temperature of 20 C or higher.

17. The method according to claim 1, wherein the belt surface of the traverse conveyor is coated with a resin.

18. The method according to claim 17, wherein the belt surface material of the traverse conveyor is one selected from polyethylene, polypropylene, polyester, polyamide, polyimide, polyurethane, polyacetal, a fluoro resin, polyvinyl chloride, an epoxy resin, and a silicon resin.

19. The method according to claim 1, wherein the particulate water-containing gel-like cross-linked polymer is obtained by gel-crushing during kneader polymerization or gel-crushing after polymerization by using a screw type extruder having a porous plate.

* * * * *